(12) United States Patent
Lemaire et al.

(10) Patent No.: US 12,515,574 B2
(45) Date of Patent: Jan. 6, 2026

(54) SYSTEMS AND METHODS FOR CONNECTING AN ACTUATOR BETWEEN A DUMP BODY AND A CHASSIS OF A TRUCK, AND HINGE ASSEMBLY FOR PIVOTALLY CONNECTING A DUMP BODY TO A CHASSIS OF A TRUCK

(71) Applicant: INDUSTRIES FABKOR INC., Saint-Gabriel-de-Brandon (CA)

(72) Inventors: Benoit Lemaire, St-Jean-de-Matha (CA); Stefane Leib, Saint-Charles-Borommee (CA); Dominic Giroux-Bernier, St-Gabriel-de-Brandon (CA)

(73) Assignee: INDUSTRIES FABKOR INC., Saint-Gabriel-de-Brandon (CA)

( * ) Notice: Subject to any disclaimer, the term of this patent is extended or adjusted under 35 U.S.C. 154(b) by 799 days.

(21) Appl. No.: 17/769,249

(22) PCT Filed: Oct. 23, 2020

(86) PCT No.: PCT/IB2020/060004
§ 371 (c)(1),
(2) Date: Apr. 14, 2022

(87) PCT Pub. No.: WO2021/079352
PCT Pub. Date: Apr. 29, 2021

(65) Prior Publication Data
US 2024/0123889 A1    Apr. 18, 2024

Related U.S. Application Data

(60) Provisional application No. 62/926,187, filed on Oct. 25, 2019.

(51) Int. Cl.
*B60P 1/28* (2006.01)

(52) U.S. Cl.
CPC .................................. *B60P 1/283* (2013.01)

(58) Field of Classification Search
CPC ................ B60P 1/16; B60P 1/28; B60P 1/283
(Continued)

(56) References Cited

U.S. PATENT DOCUMENTS 3,010,727 A    11/1961  Swensen et al.
4,779,931 A *  10/1988  Miller ..................... B60P 1/283
                                                    298/17 B
(Continued)

FOREIGN PATENT DOCUMENTS

CA           2690684 C     4/2014

OTHER PUBLICATIONS

International Search Report from PCT/IB2020/060004, Feb. 4, 2021, Geordan Vine.
(Continued)

*Primary Examiner* — Steven O Douglas
(74) *Attorney, Agent, or Firm* — BCE LLP

(57) ABSTRACT

A system for connecting an actuator between a dump body and a chassis of a truck includes a cradle assembly for connecting the actuator to the chassis, and a hoist bracket assembly for connecting the actuator to the dump body. At least one of the cradle assembly and the hoist bracket assembly includes a set of bushings for receiving the actuator therebetween and for connecting the actuator to the at least one of the cradle assembly and the hoist bracket assembly. The set of bushings is selected based on the actuator to be connected to the at least one of the cradle assembly and the hoist bracket assembly. Methods for connecting an actuator between a dump body and a chassis of a truck are also provided. A hinge assembly for pivotally connecting a dump body to a chassis of a truck is also provided.

21 Claims, 18 Drawing Sheets

(58) Field of Classification Search
USPC .......................................................... 298/17 B
See application file for complete search history.

(56) References Cited

U.S. PATENT DOCUMENTS

| | | |
|---|---|---|
| 6,409,275 B1 | 6/2002 | Gerding |
| 2008/0272641 A1 | 11/2008 | Goodwin et al. |
| 2012/0086185 A1 | 4/2012 | Kerr et al. |
| 2018/0065533 A1* | 3/2018 | Hertog ..................... B60P 1/16 |
| 2018/0312097 A1 | 11/2018 | Petrie |

OTHER PUBLICATIONS

European Search Report from EP 20878135, dated Nov. 13, 2023, Larangeira, F.

* cited by examiner

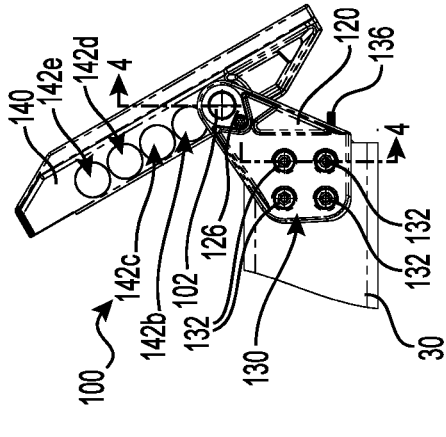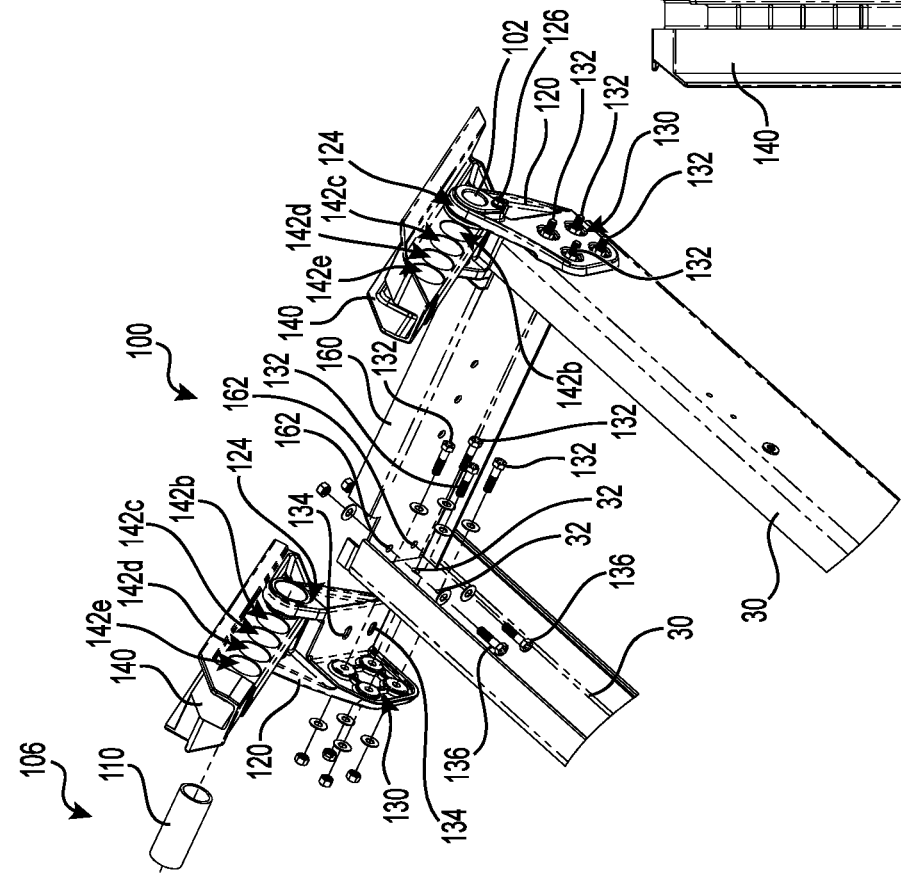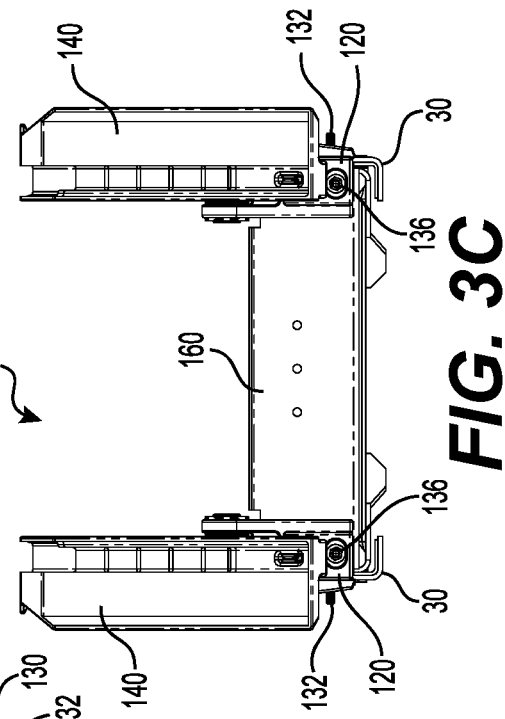

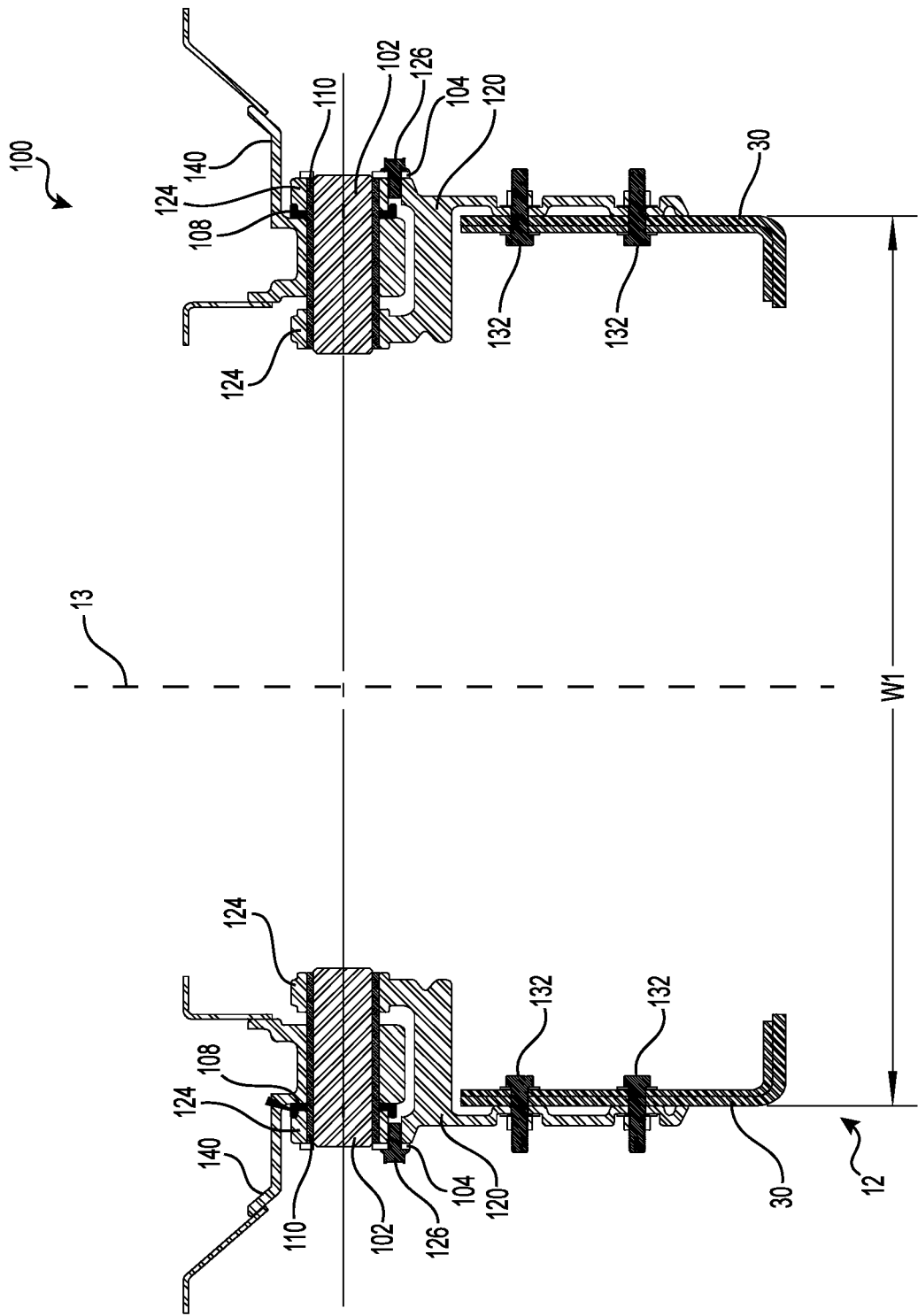

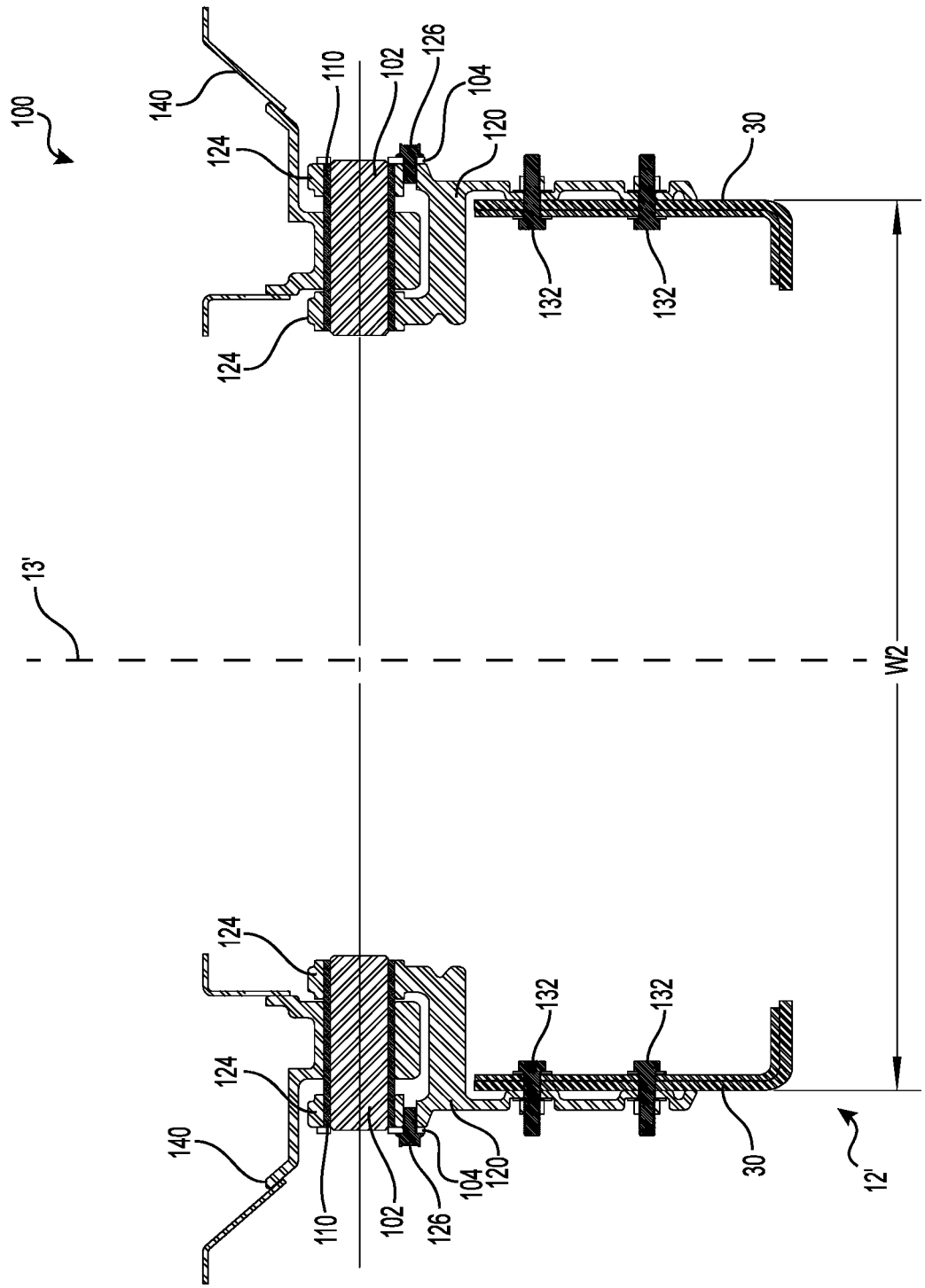

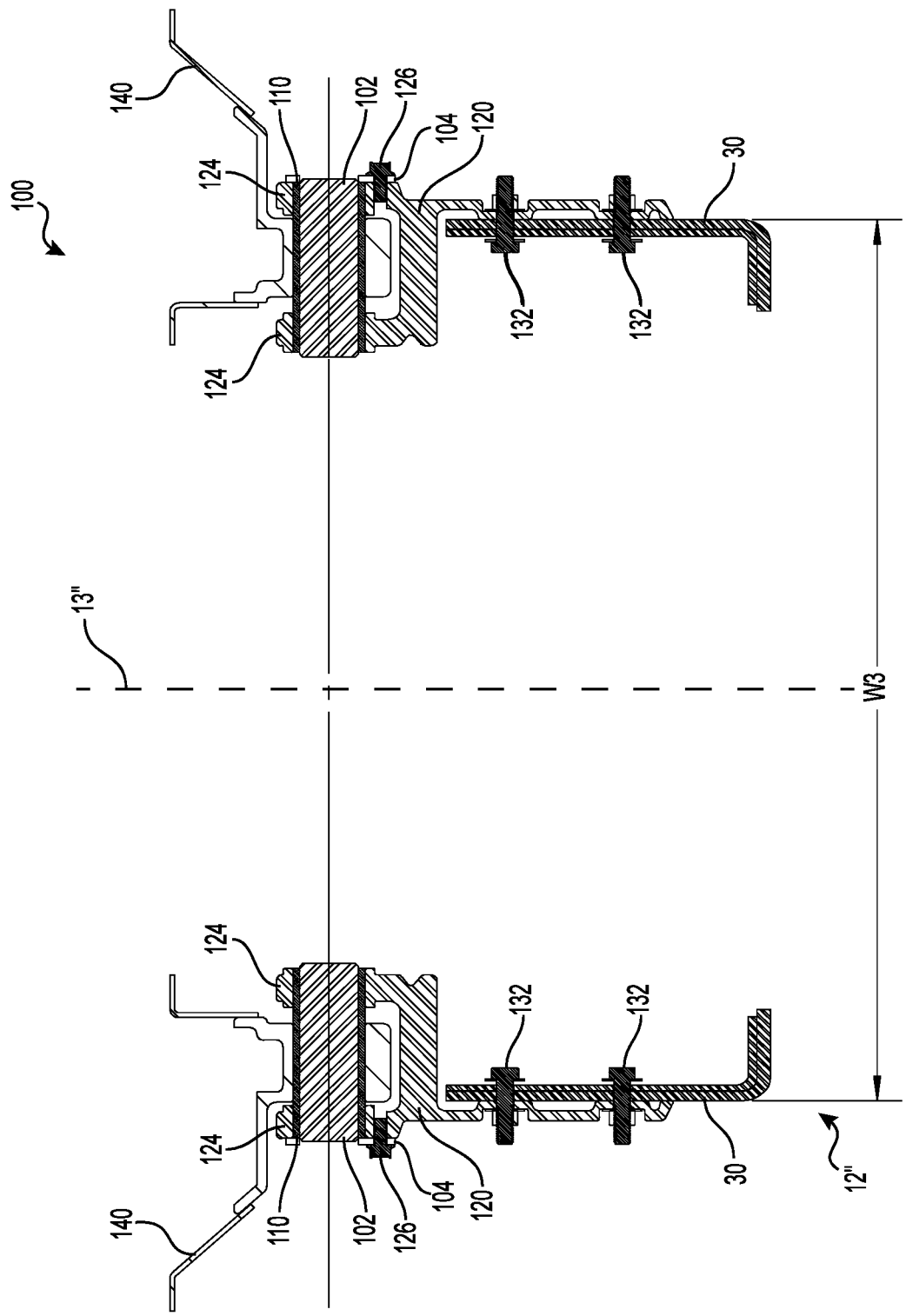

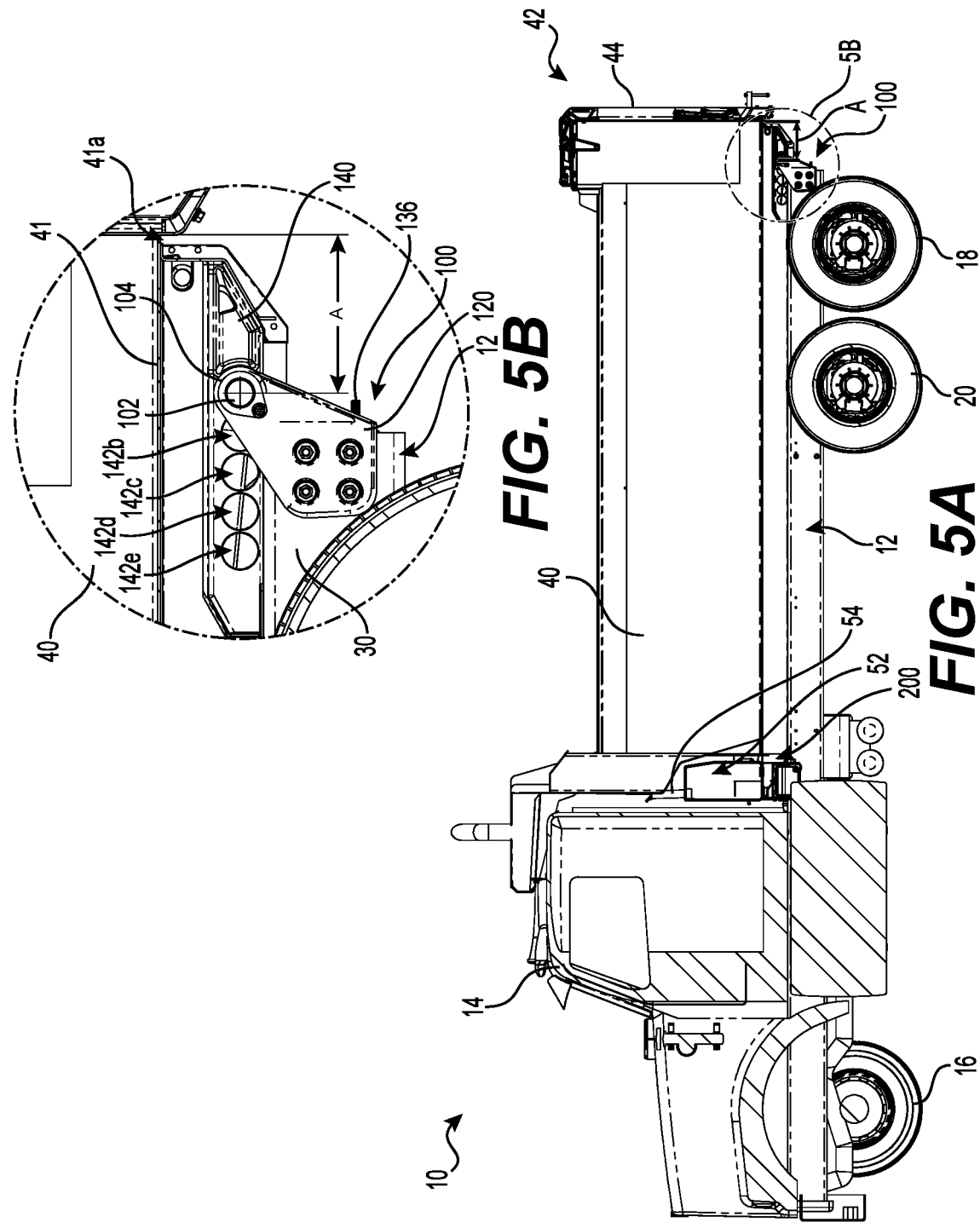

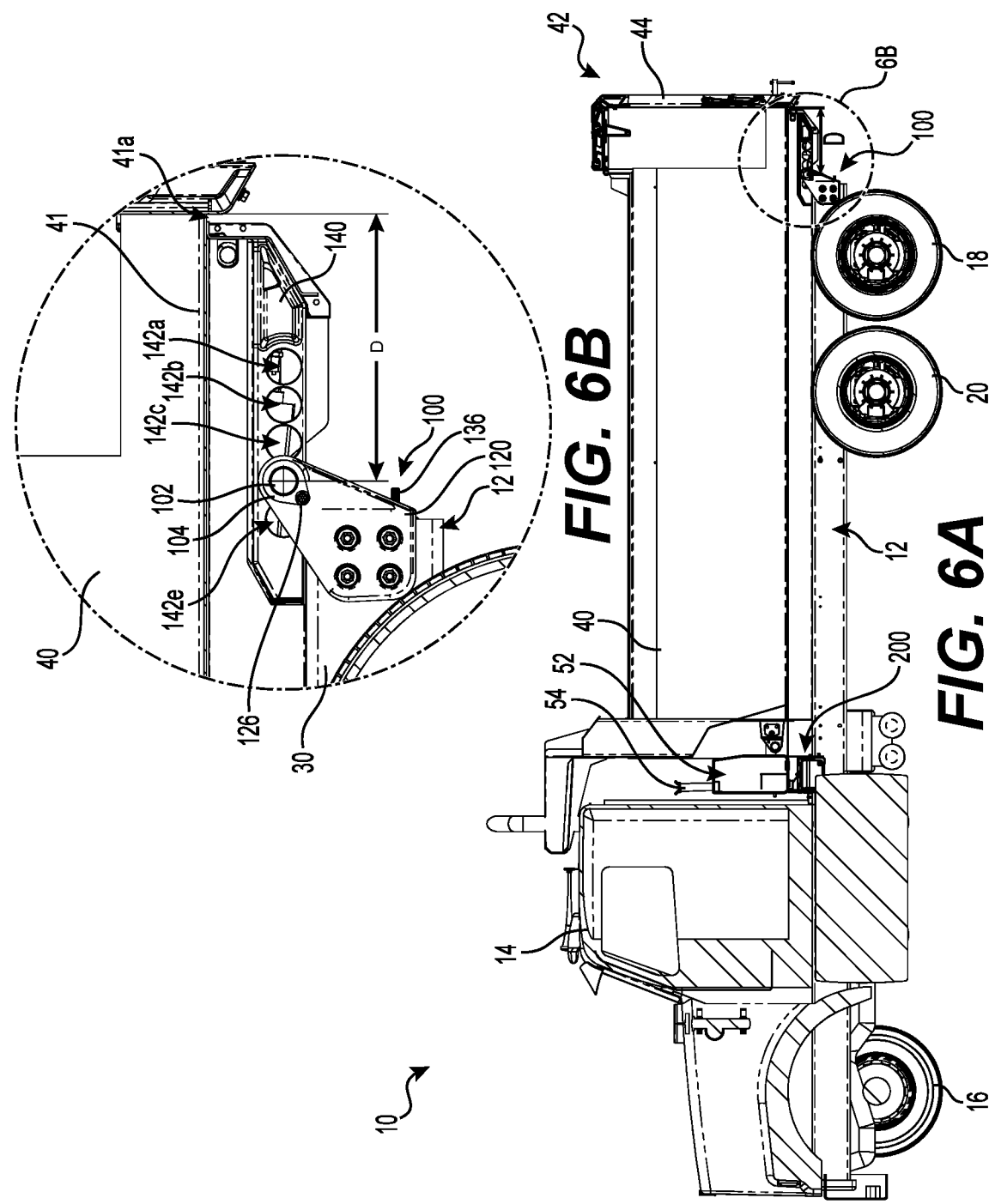

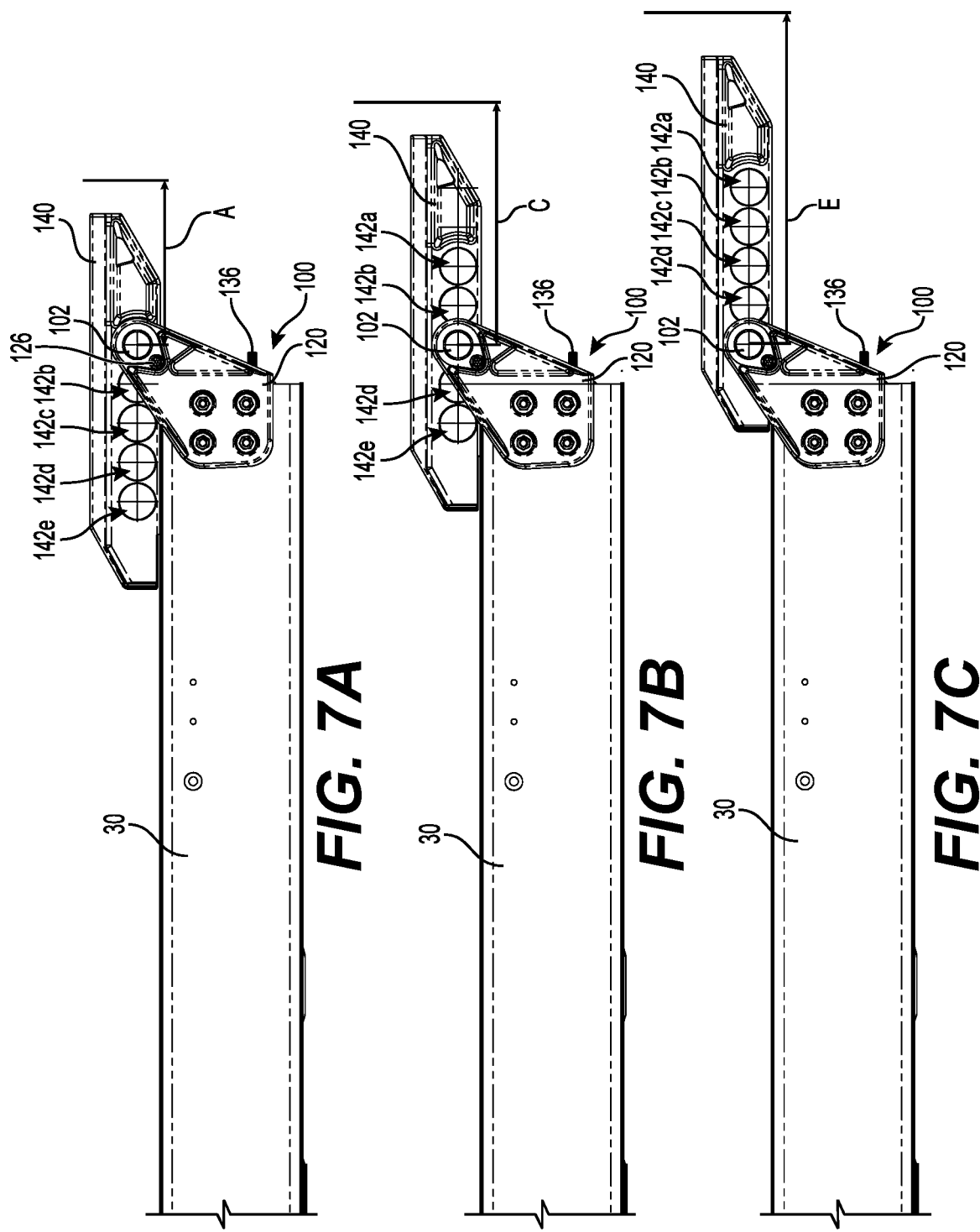

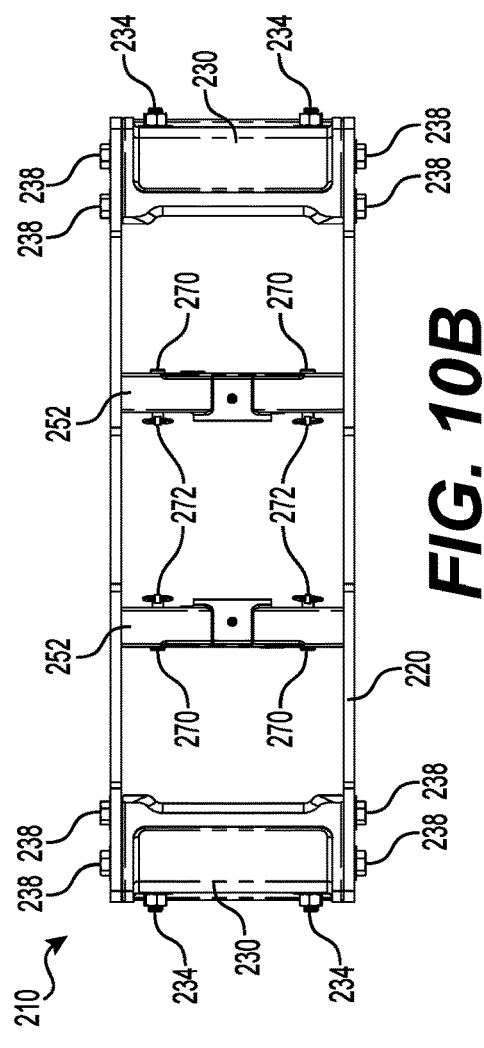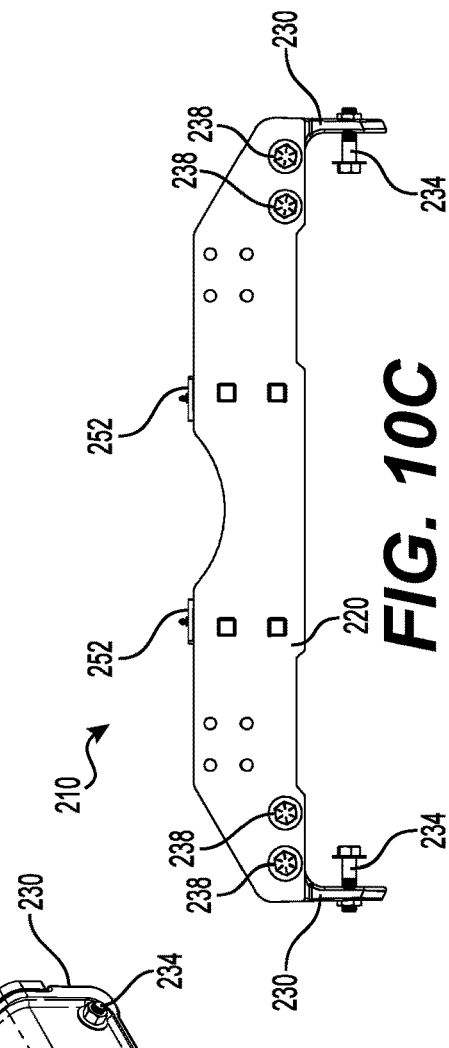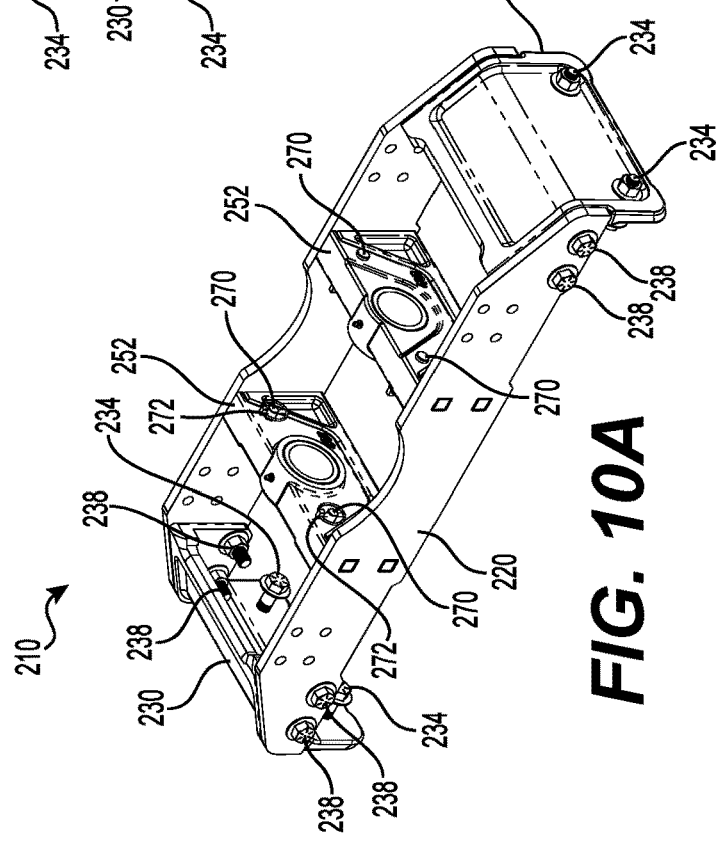

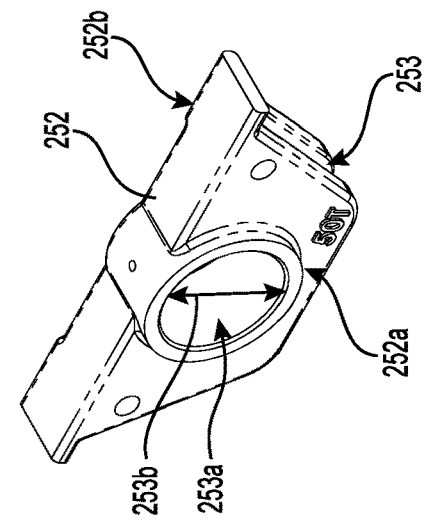
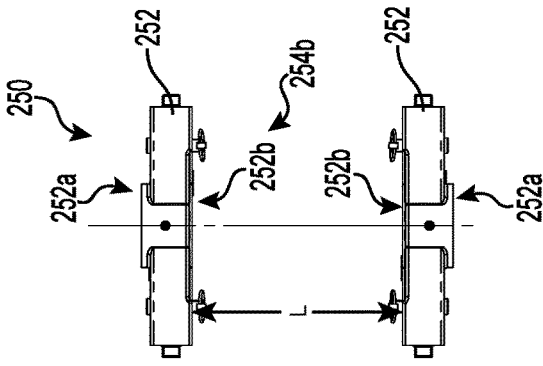
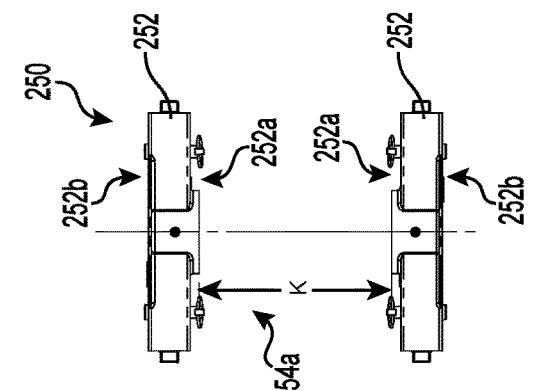
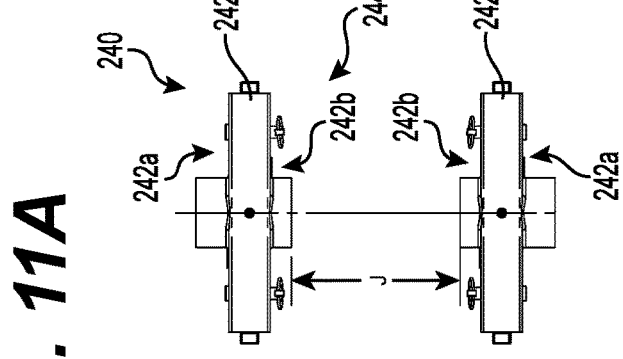
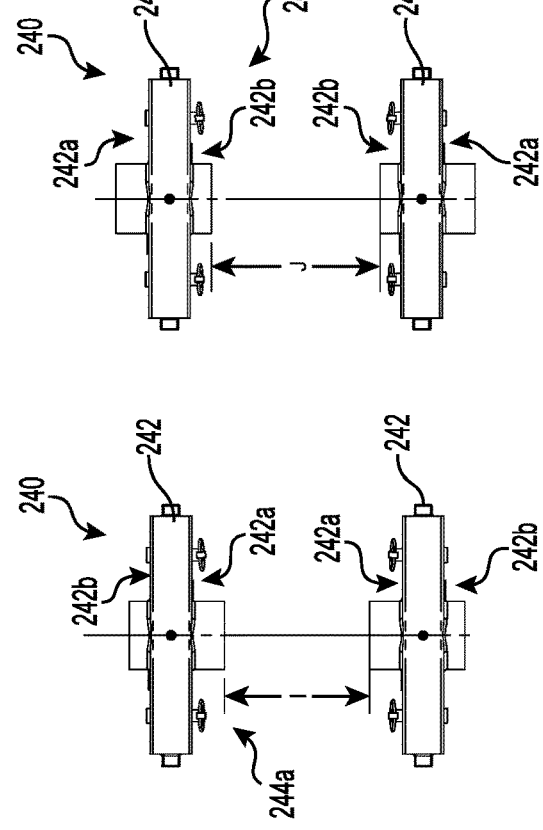

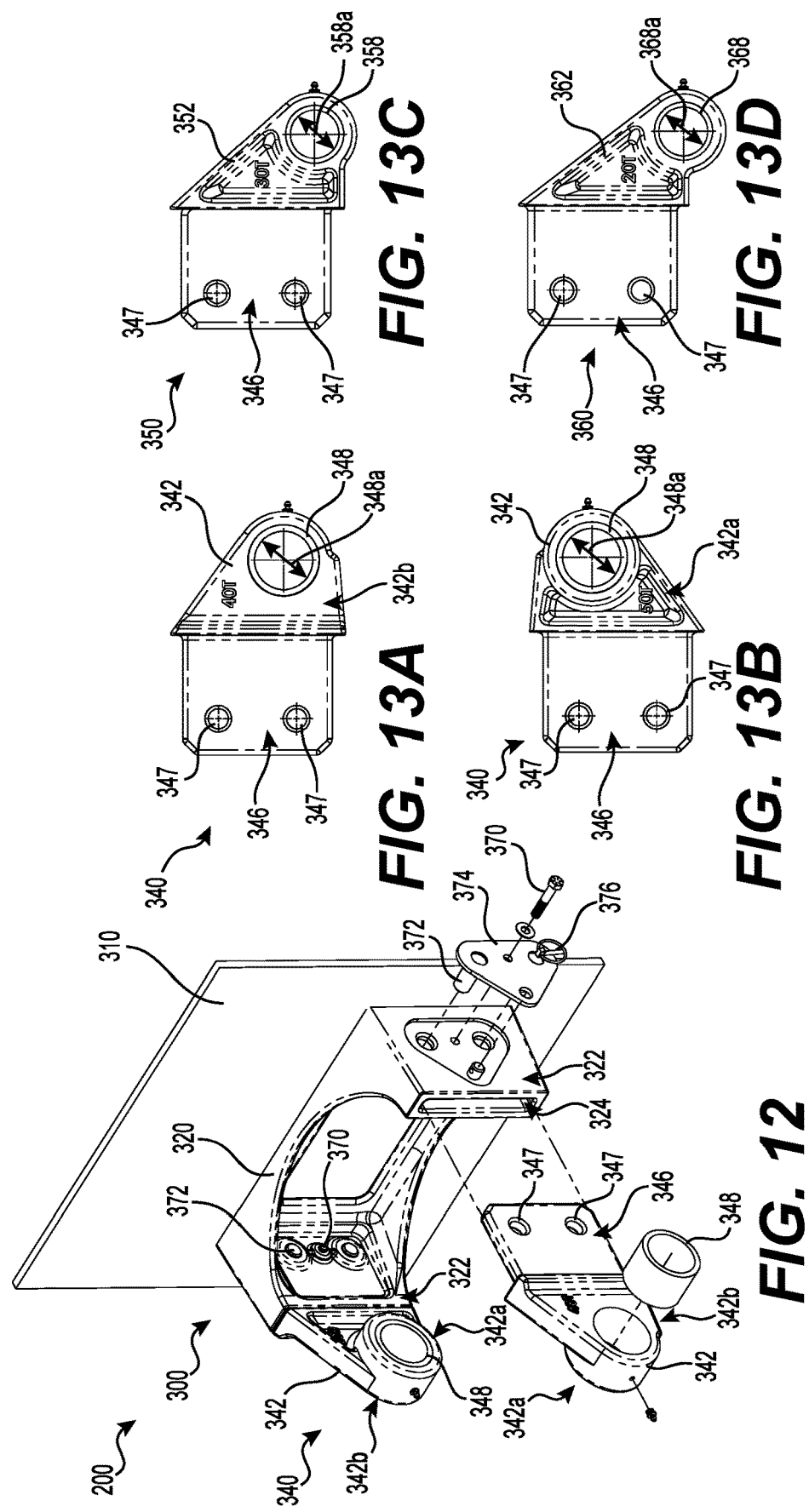

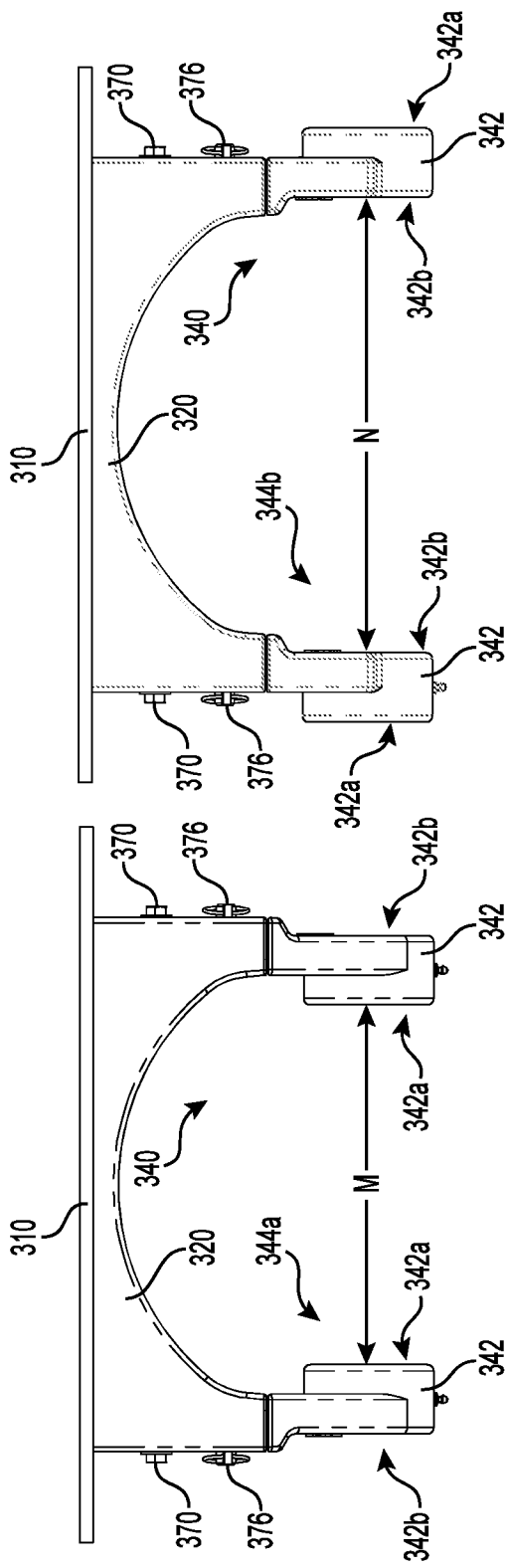
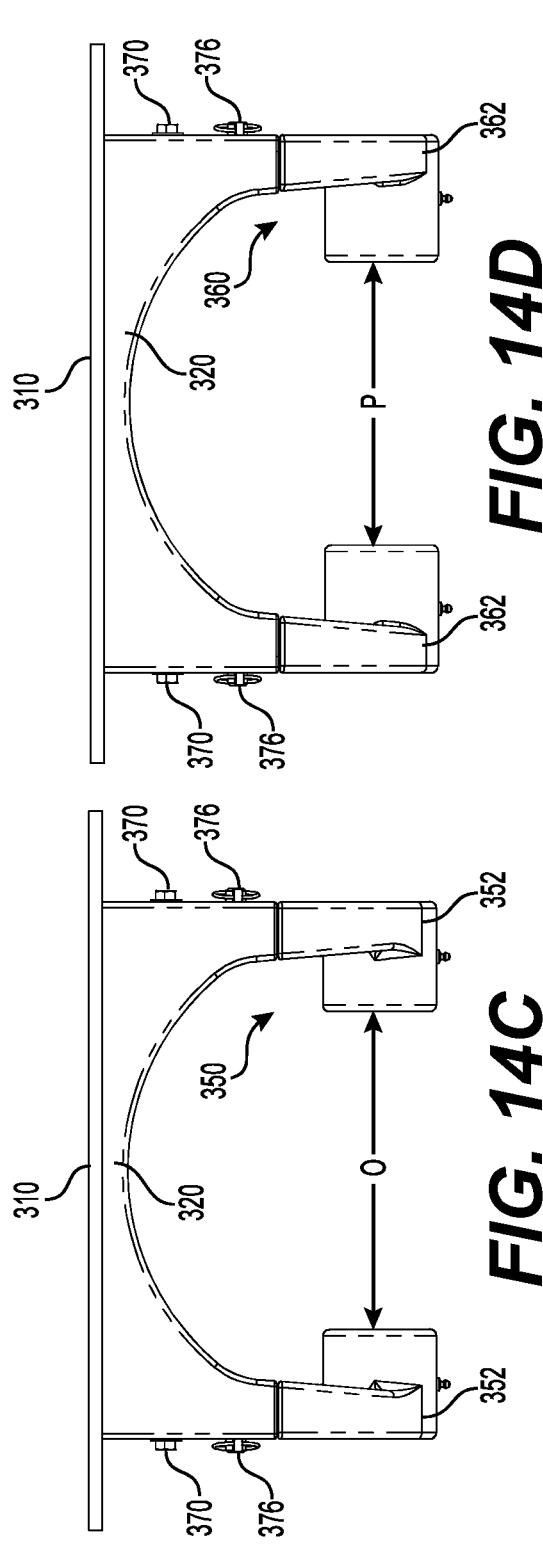

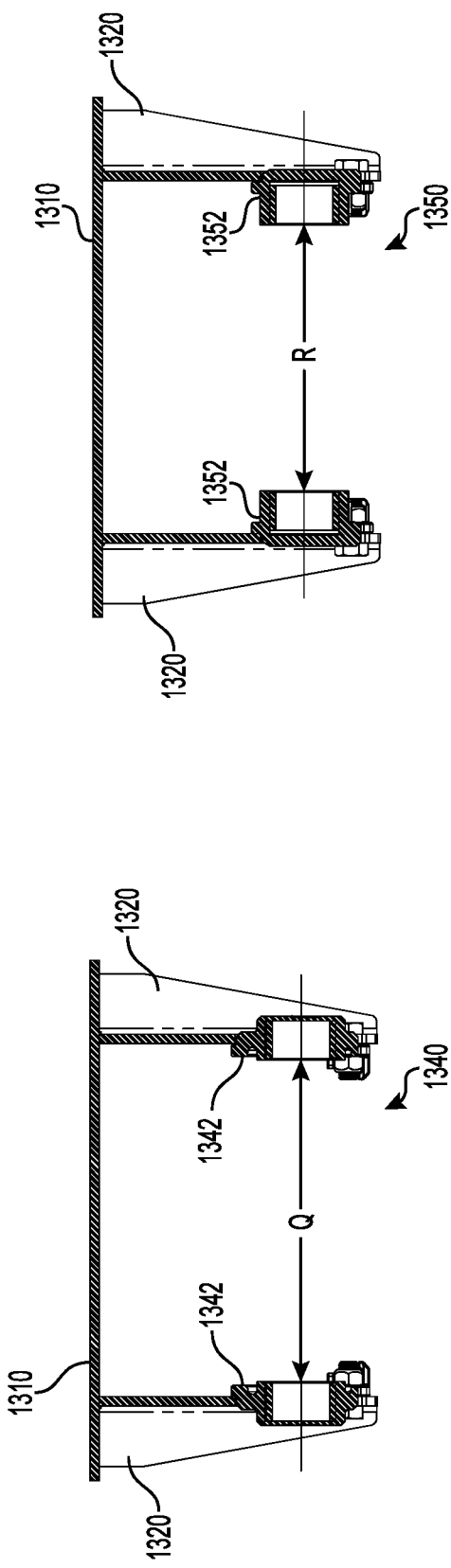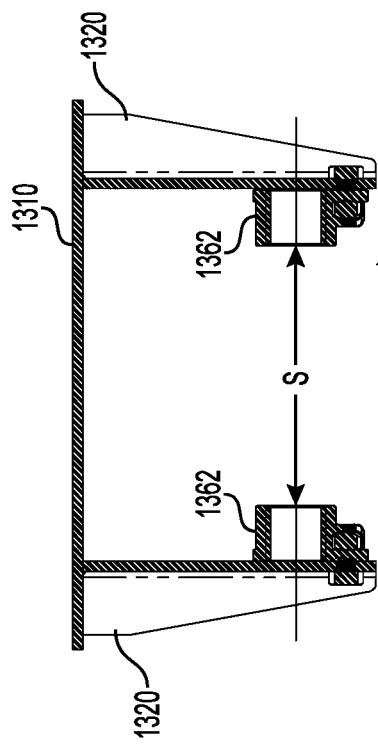

SYSTEMS AND METHODS FOR CONNECTING AN ACTUATOR BETWEEN A DUMP BODY AND A CHASSIS OF A TRUCK, AND HINGE ASSEMBLY FOR PIVOTALLY CONNECTING A DUMP BODY TO A CHASSIS OF A TRUCK

CROSS-REFERENCE TO RELATED APPLICATION

The present application claims priority to U.S. Provisional Patent Application Ser. No. 62/926,187, filed Oct. 25, 2019, entitled "Hinge Assembly For Pivotally Connecting A Dump Body To A Chassis Of A Truck, And Systems And Methods For Connecting An Actuator Between A Dump Body and A Chassis Of A Truck", which is incorporated by reference herein in its entirety.

FIELD OF TECHNOLOGY

The present technology relates to systems and methods for connecting an actuator between a dump body and a chassis of a truck, and to hinge assemblies for pivotally connecting a dump body to a chassis of a truck.

BACKGROUND

Trucks having dump bodies are used for the transport of different materials, such as rocks, soil, sand, snow and the like. These dump bodies are pivotable relative to the truck chassis to allow for their content to be emptied. The dump body is pivotable about the truck chassis via a hinge assembly that is connected between the dump body and the truck chassis. The hinge assembly is typically located at the rear of the dump body and the truck chassis. An actuator is used to pivot the dump body relative to the truck chassis, and is typically located at the front of the dump body, behind the truck cab. The actuator is connected to the truck chassis via a cradle assembly, and is connected to the dump body via a hoist bracket assembly.

Trucks and dump bodies can be of various sizes and/or capacities. When installing a dump body on a truck chassis, the actuator, the cradle assembly, the hoist bracket assembly and the hinge assembly are selected in accordance with the specified size and/or capacity of the dump body. This leads manufacturers to keep a variety of these components in inventory to install dump bodies on different truck chassis using different actuators. Such installation is generally performed by welding several components to the truck chassis.

However, welding the components to the truck chassis or to the dump body presents assembly challenges, notably due to possible alignment and fit issues. Moreover, welding the components also presents the drawback that the components are permanently connected to the dump body or truck chassis, which prevents convenient changing of the configuration of the dump body and/or actuator on the truck chassis if so desired.

There is therefore a desire for improvements in the way dump bodies are connected to truck chassis.

SUMMARY

It is an object of the present technology to ameliorate at least some of the inconveniences present in the prior art.

In some circumstances, the present technology facilitates the assembly of dump body on a chassis of a truck compared to conventional assembly systems and methods. The present technology provides that the hinge assembly is removably connected to the dump body and to the chassis of the truck. By using fastened connections, some of the issues and drawbacks of conventional assembly systems and methods that used welded connections are avoided. For example, the issues related to the selection of the overhang of the dump body relative to the chassis are addressed by providing a hinge assembly having different selectable overhangs.

Having the cradle assembly removably connected to the chassis of the truck also leads to shorter assembly times. Moreover, having the cradle assembly and hoist bracket assembly of the present technology using different sets of bushings also provides a user with flexibility for selecting the actuator that is to be connected between the chassis and the dump body. If needed, a user can disconnect a first actuator from the cradle assembly and hoist bracket assembly, select the configuration of the sets of bushing or replace the sets of bushings based on a second actuator that the user has selected, and connect the second actuator to the cradle assembly and the hoist bracket assembly using the appropriate sets of bushings.

These features and additional features of the present technology will be described in more details below.

In accordance with one aspect of the present technology, there is provided a system for connecting an actuator between a dump body and a chassis of a truck, the dump body being pivotally connected to the chassis of the truck. The system includes a cradle assembly for connecting the actuator to the chassis, the cradle assembly being adapted to be removably connected to the chassis, a hoist bracket assembly for connecting the actuator to the dump body, and at least one of the cradle assembly and the hoist bracket assembly including a set of bushings for receiving the actuator therebetween and for connecting the actuator to the at least one of the cradle assembly and the hoist bracket assembly. The set of bushings is selected from a first set of bushings and a second set of bushings, the first set of bushings being adapted to define at least one first spacing between the bushings, the second set of bushings being adapted to define at least one second spacing between the bushings, and the one of the first and second sets of bushings being selected based on the actuator to be connected to the at least one of the cradle assembly and the hoist bracket assembly.

In some embodiments, the set of bushings is adapted for a trunnion type connection between the chassis and the dump body.

In some embodiments, the set of bushings is adapted for a pin-to-pin type connection between the chassis and the dump body.

In some embodiments, the at least one of the cradle assembly and the hoist bracket assembly is the cradle assembly. The chassis includes first and second laterally spaced longitudinal support structures adapted for supporting the dump body, and the cradle assembly includes first and second cradle attachment brackets adapted to be removably connected to the first and second laterally spaced longitudinal support structures respectively, and a support frame adapted to be removably connected to the first and second cradle attachment brackets. The support frame is dimensioned for extending laterally between the first and second laterally spaced longitudinal support structures of the chassis, the support frame having spaced apart first and second cradle bushing mounts.

In some embodiments, the support frame is dimensioned and structured to extend above the first and second laterally spaced support structures of the chassis.

In some embodiments, the support frame defines a plurality of slotted holes. The support frame is removably connected to the first and second cradle attachment brackets using a plurality of fasteners, and each fastener of the plurality of fasteners extends through a respective slotted hole of the plurality of slotted holes.

In some embodiments, the cradle assembly further includes first and second reinforcing channels adapted to receive therein the first and second laterally spaced longitudinal support structures respectively. The first cradle attachment bracket is adapted to be removably connected simultaneously to the first reinforcing channel and to the first laterally spaced longitudinal support structure. The second cradle attachment bracket is adapted to be removably connected simultaneously to the second reinforcing channel and to the second laterally spaced longitudinal support structure.

In some embodiments, the support frame is adapted to support at least one of a hydraulic system for operating the actuator, and a safety holder adapted for supporting the dump body.

In some embodiments, the at least one first spacing includes a first cradle spacing, and the at least one second spacing includes a second cradle spacing. The first set of bushings includes first and second cradle bushings adapted to be removably connected to the first and second cradle bushing mounts and to connect to the actuator. The second set of bushings includes third and fourth cradle bushings adapted to be removably connected to the first and second cradle bushing mounts and to connect to the actuator. When the first and second cradle bushings are removably connected to the first and second cradle bushing mounts, the cradle assembly has the first cradle spacing. When the third and fourth cradle bushings are removably connected to the first and second cradle bushing mounts, the cradle assembly has the second cradle spacing.

In some embodiments, the first cradle bushing is identical to the second cradle bushing.

In some embodiments, the third cradle bushing is identical to the fourth cradle bushing.

In some embodiments, each cradle bushing is removably connected to one of the first and second cradle bushing mounts using a plurality of clevis pins and a plurality of linchpins.

In some embodiments, the at least one of the cradle assembly and the hoist bracket assembly is the hoist bracket assembly. The hoist bracket assembly has a base plate adapted to be connected to the dump body, and a bracket adapted to be connected to the base plate. The bracket has first and second hoist bushing mounts. The first set of bushings is a first set of hoist bushings and the second set of bushing is a second set of hoist bushings. The at least one first spacing includes a first hoist spacing, and the at least one second spacing includes a second hoist spacing. The first set of hoist bushings has first and second hoist bushings adapted to be removably connected to the first and second hoist bushing mounts and to connect to the actuator, the first set of hoist bushings defining the first hoist spacing when connected to the first and second hoist bushing mounts. The second set of hoist bushings has third and fourth hoist bushings adapted to be removably connected to the first and second hoist bushing mounts and to connect to the actuator, the second set of hoist bushings defining the second hoist spacing when connected to the first and second hoist bushing mounts, the second hoist spacing being different from the first hoist spacing.

In some embodiments, the first hoist bushing is a mirror image of the second hoist bushing.

In some embodiments, the third hoist bushing is a mirror image of the fourth hoist bushing.

In some embodiments, the set of bushings is selected from the first set of hoist bushings, the second set of hoist bushings and a third set of hoist bushings. The third set of hoist bushings having fifth and sixth hoist bushings adapted to be removably connected to the first and second hoist bushing mounts and to connect to the actuator, the third set of hoist bushings being adapted to define a third hoist spacing between the fifth and sixth hoist bushings. The third set of hoist bushings defines the third hoist spacing when connected to the first and second hoist bushing mounts, the third hoist spacing being different from the first and second hoist spacings.

In some embodiments, each hoist bushing is removably connected to one of the first and second hoist bushing mounts using at least one of a fastener, a pin and a linchpin.

A truck has a chassis, a cab connected to the chassis, a plurality of wheels rotatably connected to the chassis, a dump body pivotally connected to the chassis, and an actuator connected between the dump body and the chassis by the system described above.

In accordance with yet another aspect of the present technology, there is provided a system for connecting an actuator between a dump body and a chassis of a truck, the dump body being pivotally connected to the chassis of the truck. The system includes a cradle assembly for connecting the actuator to the chassis, the cradle assembly being adapted to be removably connected to the chassis, a hoist bracket assembly for connecting the actuator to the dump body, and at least one of the cradle assembly and the hoist bracket assembly including a set of bushings being configurable in a first bushing configuration and in a second bushing configuration adapted to define first and second spacings respectively for receiving the actuator therebetween, and one of the first and second bushing configurations being selected based on the actuator.

In some embodiments, the set of bushings is adapted for a trunnion type connection between the chassis and the dump body.

In some embodiments, the set of bushings is adapted for a pin-to-pin type connection between the chassis and the dump body.

In some embodiments, the at least one of the cradle assembly and the hoist bracket assembly is the cradle assembly. The chassis includes first and second laterally spaced longitudinal support structures adapted for supporting the dump body, and the cradle assembly includes first and second cradle attachment brackets adapted to be removably connected to the first and second laterally spaced longitudinal support structures respectively, and a support frame adapted to be removably connected to the first and second cradle attachment brackets. The support frame is dimensioned for extending laterally between the first and second laterally spaced longitudinal support structures of the chassis, the support frame having spaced apart first and second cradle bushing mounts.

In some embodiments, the support frame is dimensioned and structured to extend above the first and second laterally spaced support structures of the chassis.

In some embodiments, the support frame defines a plurality of slotted holes. The support frame is removably connected to the first and second cradle attachment brackets using a plurality of fasteners, and each fastener of the plurality of fasteners extends through a respective slotted hole of the plurality of slotted holes.

In some embodiments, the cradle assembly further includes first and second reinforcing channels adapted to receive therein the first and second laterally spaced longitudinal support structures respectively. The first cradle attachment bracket is adapted to be removably connected simultaneously to the first reinforcing channel and to the first laterally spaced longitudinal support structure. The second cradle attachment bracket is adapted to be removably connected simultaneously to the second reinforcing channel and to the second laterally spaced longitudinal support structure.

In some embodiments, the support frame is adapted to support at least one of a hydraulic system for operating the actuator, and a safety holder adapted for supporting the dump body.

In some embodiments, the set of bushings includes first and second cradle bushings adapted to be removably connected to the first and second cradle bushing mounts and to connect to the actuator. Each of the first and second cradle bushings respectively has first and second sides. The first bushing configuration is a first cradle bushing configuration. The second bushing configuration is a second cradle bushing configuration. The first spacing is a first cradle spacing. The second spacing is a second cradle spacing. When the first and second cradle bushings are removably connected to the first and second cradle bushing mounts in the first cradle bushing configuration, the first side of the first cradle bushing faces towards the first side of the second cradle bushing, the second side of the first cradle bushing faces away from the second side of the second cradle bushing, and the cradle assembly has the first cradle spacing defined between the first side of the first cradle bushing and the first side of the second cradle bushing. When the first and second cradle bushings are removably connected to the first and second cradle bushing mounts in the second cradle bushing configuration, the first side of the first cradle bushing faces away from the first side of the second cradle bushing, the second side of the first cradle bushing faces towards the second side of the second cradle bushing, and the cradle assembly has the second cradle spacing defined between the second side of the first cradle bushing and the second side of the second cradle bushing.

In some embodiments, the first cradle bushing is identical to the second cradle bushing.

In some embodiments, each cradle bushing is removably connected to one of the first and second cradle bushing mounts using a plurality of clevis pins and a plurality of linchpins.

In some embodiments, the at least one of the cradle assembly and the hoist bracket assembly is the hoist bracket assembly. The hoist bracket assembly has a base plate adapted to be connected to the dump body, and a bracket adapted to be connected to the base plate. The bracket has first and second hoist bushing mounts. The set of bushings includes first and second hoist bushings adapted to be removably connected to the first and second hoist bushing mounts and to connect to the actuator, each of the first and second hoist bushings respectively having first and second sides. The first bushing configuration is a first hoist bushing configuration. The second bushing configuration is a second hoist bushing configuration. The first spacing is a first hoist spacing. The second spacing is a second hoist spacing. When the first and second hoist bushings are removably connected to the first and second hoist bushing mounts in the first hoist bushing configuration, the first side of the first hoist bushing faces towards the first side of the second hoist bushing, the second side of the first hoist bushing faces away from the second side of the second hoist bushing, and the hoist bracket assembly has the first hoist spacing defined between the first side of the first hoist bushing and the first side of the second hoist bushing. When the first and second hoist bushings are removably connected to the first and second hoist bushing mounts in the second hoist bushing configuration, the first side of the first hoist bushing faces away from the first side of the second hoist bushing, the second side of the first hoist bushing faces towards the second side of the second hoist bushing, and the hoist bracket assembly has the second hoist spacing defined between the second side of the first hoist bushing and the second side of the second hoist bushing.

In some embodiments, the first hoist bushing is a mirror image of the second hoist bushing.

In some embodiments, each of the first and second hoist bushings is removably connected to one of the first and second hoist bushing mounts using at least one of a fastener, a pin and a linchpin.

A truck has a chassis, a cab connected to the chassis, a plurality of wheels rotatably connected to the chassis, a dump body pivotally connected to the chassis, and an actuator connected between the dump body and the chassis by the system described above.

In accordance with yet another aspect of the present technology, there is provided a method for connecting an actuator between a dump body and a chassis of a truck, the dump body being pivotally connected to the chassis of the truck. The method includes connecting a cradle assembly to the chassis, connecting a hoist bracket assembly to the dump body, selecting the actuator from a first actuator, and a second actuator, connecting the selected one of the first and second actuators to the cradle assembly and the hoist bracket assembly. When the first actuator is selected, connecting at least one of (i) a set of cradle bushings to the cradle assembly in a first cradle bushing configuration for defining a first cradle spacing adapted for receiving the first actuator, and connecting the first actuator to the cradle assembly comprises connecting the set of cradle bushings to the first actuator, and (ii) a set of hoist bushings to the hoist bracket assembly in a first hoist bushing configuration for defining a first hoist spacing adapted for receiving the first actuator, and connecting the first actuator to the hoist bracket assembly comprises connecting the set of hoist bushings to the first actuator. When the second actuator is selected, connecting at least one of (i) the set of cradle bushings to the cradle assembly in a second cradle bushing configuration for defining a second cradle spacing adapted for receiving the second actuator, the second cradle spacing being different from the first cradle spacing, and connecting the second actuator to the cradle assembly comprises connecting the set of cradle bushings to the second actuator, and (ii) the set of hoist bushings to the hoist bracket assembly in a second hoist bushing configuration for defining a second hoist spacing adapted for receiving the second actuator, the second hoist spacing being different from the first hoist spacing, and connecting the second actuator to the hoist bracket assembly comprises connecting the set of hoist bushings to the second actuator.

In some embodiments, the set of cradle bushings includes first and second cradle bushings. Each of the first and second cradle bushings has a first side and a second side. When the first and second cradle bushings are in the first cradle bushing configuration, the first side of the first cradle bushing faces towards the first side of the second cradle bushing, the second side of the first cradle bushing faces away from the second side of the second cradle bushing, and the first cradle spacing is defined between the first side of the first cradle bushing and the first side of the second cradle bushing. When the first and second cradle bushings are in the second cradle bushing configuration, the first side of the first cradle bushing faces away from the first side of the second cradle bushing, the second side of the first cradle bushing faces towards the second side of the second cradle bushing, and the second cradle spacing is defined between the second side of the first cradle bushing and the second side of the second cradle bushing.

In some embodiments, the set of hoist bushings includes first and second hoist bushings. Each of the first and second hoist bushings has a first side and a second side. When the first and second hoist bushings are in the first hoist bushing configuration, the first side of the first hoist bushing faces towards the first side of the second hoist bushing, the second side of the first hoist bushing faces away from the second side of the second hoist bushing, and the first hoist spacing is defined between the first side of the first hoist bushing and the first side of the second hoist bushing. When the first and second hoist bushings are in the second hoist bushing configuration, the first side of the first hoist bushing faces away from the first side of the second hoist bushing, the second side of the first hoist bushing faces towards the second side of the second hoist bushing, and the second hoist spacing is defined between the second side of the first hoist bushing and the second side of the second hoist bushing.

In some embodiments, the cradle assembly is adapted to be removably connected to the chassis.

In accordance with yet another aspect of the present technology, there is provided a method for connecting an actuator between a dump body and a chassis of a truck, the dump body being pivotally connected to the chassis of the truck. The method includes connecting a cradle assembly to the chassis, connecting a hoist bracket assembly to the dump body, selecting the actuator from a first actuator, and a second actuator, connecting the selected one of the first and second actuators to the cradle assembly and the hoist bracket assembly. When the first actuator is selected, connecting at least one of (i) a first set of cradle bushings to the cradle assembly for defining a first cradle spacing adapted for receiving the first actuator, and connecting the first actuator to the cradle assembly comprises connecting the first set of cradle bushings to the first actuator, and (ii) a first set of hoist bushings to the hoist bracket assembly for defining a first hoist spacing adapted for receiving the first actuator, and connecting the first actuator to the hoist bracket assembly comprises connecting the first set of hoist bushings to the first actuator. When the second actuator is selected, connecting at least one of (i) a second set of cradle bushings to the cradle assembly for defining a second cradle spacing adapted for receiving the second actuator, the second cradle spacing being different from the first cradle spacing, and connecting the second actuator to the cradle assembly comprises connecting the second set of cradle bushings to the second actuator, and (ii) a second set of hoist bushings to the hoist bracket assembly for defining a second hoist spacing adapted for receiving the second actuator, the second hoist spacing being different from the first hoist spacing, and connecting the second actuator to the hoist bracket assembly comprises connecting the second set of hoist bushings to the second actuator.

In accordance with yet another aspect of the present technology, there is provided a method for connecting an actuator between a dump body and a chassis of a truck, the dump body being pivotally connected to the chassis of the truck. The method includes connecting a cradle assembly to the chassis, connecting a hoist bracket assembly to the dump body, selecting the actuator from a first actuator, a second actuator, a third actuator, and a fourth actuator. When the first actuator is selected, connecting the first actuator to one of the cradle assembly and the hoist bracket assembly using a first set of bushings connected to the one of the cradle assembly and the hoist bracket assembly in a first configuration defining a first spacing between the bushings, and connecting the first actuator to another one of the cradle assembly and the hoist bracket assembly. When the second actuator is selected, connecting the second actuator to the one of the cradle assembly and the hoist bracket assembly using the first set of bushings connected to the one of the cradle assembly and the hoist bracket assembly in a second configuration defining a second spacing between the bushings, the second spacing being different from the first spacing, and connecting the second actuator to the other one of the cradle assembly and the hoist bracket assembly. When the third actuator is selected, connecting the third actuator to the one of the cradle assembly and the hoist bracket assembly using a second set of bushings connected to the one of the cradle assembly and the hoist bracket assembly in a third configuration defining a third spacing between the bushings, the third spacing being different from the first and second spacings, and connecting the third actuator to the other one of the cradle assembly and the hoist bracket assembly. When the fourth actuator is selected, connecting the fourth actuator to the one of the cradle assembly and the hoist bracket assembly using the second set of bushings connected to the one of the cradle assembly and the hoist bracket assembly in a fourth configuration defining a fourth spacing between the bushings, the fourth spacing being different from the first, second and third spacings, and connecting the fourth actuator to the other one of the cradle assembly and the hoist bracket assembly.

In accordance with yet another aspect of the present technology, there is provided a hinge assembly for pivotally connecting a dump body to a chassis of a truck. The chassis includes first and second laterally spaced longitudinal support structures adapted for supporting the dump body, and the dump body has a floor. The hinge assembly includes first and second hinge pins, first and second hinge brackets adapted to be removably connected to the first and second laterally spaced longitudinal support structures respectively, the first and second hinge brackets being adapted for receiving the first and second hinge pins respectively, and first and second sills adapted to be secured to the floor of the dump body, each of the first and second sills defining first and second apertures. The first and second apertures of the first sill are dimensioned for receiving the first hinge pin. The first and second apertures of the second sill are dimensioned for receiving the second hinge pin. When the first and second hinge pins are inserted in the first apertures of the first and second sills respectively, the dump body has a first overhang. When the first and second hinge pins are inserted in the second apertures of the first and second sills respectively, the dump body has a second overhang, the second overhang being different from the first overhang.

In some embodiments, the hinge assembly further includes a cross plate adapted to be removably connected between the first and second hinge brackets.

In some embodiments, the cross plate is dimensioned for spanning laterally between the first and second laterally spaced longitudinal support structures of the chassis.

In some embodiments, each of the first and second hinge brackets defines a plurality of slotted holes. The first and second hinge brackets are removably connected to the first and second laterally spaced support structures respectively using a first plurality of fasteners. The cross plate is removably connected to the first and second hinge brackets using a second plurality of fasteners, and each fastener of the second plurality of fasteners extends through a corresponding slotted hole of the plurality of slotted holes In some embodiments, the hinge assembly further includes first and second hinge pin assemblies. The first hinge pin assembly includes the first hinge pin, the first hinge pin having a first flange, and the first hinge pin assembly further includes at least one of a first hinge pin shim disposed on the first hinge pin, and a first hinge sleeve bearing disposed on the first hinge pin. The second hinge pin assembly includes the second hinge pin, the second hinge pin having a second flange, and the second hinge pin assembly further includes at least one of a second hinge pin shim disposed on the first hinge pin, and a second hinge sleeve bearing disposed on the second hinge pin.

In some embodiments, the first hinge pin shim is disposed between the first sill and the first hinge bracket, and the second hinge pin shim is disposed between the second sill and the second hinge bracket.

In some embodiments, the first hinge pin is fastened to the first hinge bracket via a first fastener extending through the first flange, and the second hinge pin is fastened to the second hinge bracket via a second fastener extending through the second flange In some embodiments, at least one of the at least one first hinge pin shim, the at least one second hinge pin shim, the first hinge sleeve bearing, and the second hinge sleeve bearing is made of an aluminum and brass alloy.

In some embodiments, the first hinge pin assembly is identical to the second hinge pin assembly.

In some embodiments, the first hinge bracket is a mirror image of the second hinge bracket.

In some embodiments, the first sill is a mirror image of the second sill.

In some embodiments, each of the first and second sills further defines a third aperture, a fourth aperture, and a fifth aperture. The first, second, third, fourth and fifth apertures are disposed in-line in the first and second sills. When the first and second hinge pins are inserted in the third apertures of the first and second sills respectively, the dump body has a third overhang, the third overhang being different from the first and second overhangs. When the first and second hinge pins are inserted in the fourth apertures of the first and second sills respectively, the dump body has a fourth overhang, the fourth overhang being different from the first, second and third overhangs. When the first and second hinge pins are inserted in the fifth apertures of the first and second sills respectively, the dump body has a fifth overhang, the fifth overhang being different from the first, second, third and fourth overhangs.

A truck includes a chassis, a cab connected to the chassis, a plurality of wheels rotatably connected to the chassis, a dump body, and the hinge assembly as described above for pivotally connecting the dump body to the chassis.

For the purposes of the present application, terms related to spatial orientation such as front, rear, left and right should be understood as they would normally be understood by a driver of a truck having a dump body sitting in the truck in a normal driving position with the dump body in a lowered position.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3A is a partially exploded, perspective view taken from a top, front, left side of the hinge assembly and chassis of FIG. 2, with the dump body removed and with the hinge assembly pivoted in the raised position;

FIG. 3B is a left side elevation view of the hinge assembly and chassis of FIG. 3A;

FIG. 3C is a rear view of the hinge assembly and chassis of FIG. 3A;

FIG. 4A is a cross-sectional view of the hinge assembly and chassis of FIG. 3B taken along cross-section line 4-4 of FIG. 3B, with the hinge assembly in the lowered position, the chassis having a width W1 and being provided with left and right hinge pin shims;

FIG. 4B is a cross-sectional view of the hinge assembly and chassis of FIG. 3B taken along cross-section line 4-4 of FIG. 3B, with the hinge assembly in the lowered position, the chassis having a width W2 and the hinge assembly being free of left and right hinge pin shims;

FIG. 4C is a cross-sectional view of the hinge assembly and chassis of FIG. 3B taken along cross-section line 4-4 of FIG. 3B, with the hinge assembly in the lowered position, the chassis having a width W3 and the hinge assembly being free of left and right hinge pin shims;

FIG. 5A is a left side elevation view of the truck of FIG. 1, with the dump body pivoted in the lowered position and with the hinge assembly having an overhang A, and with the left intermediate and rear wheels;

FIG. 5B is an enlarged view of portion 5B of FIG. 5A;

FIG. 6A is a left side elevation view of the truck of FIG. 1, with the dump body pivoted in the lowered position and with the rear hinge assembly having an overhang D, and with the left intermediate and rear wheels;

FIG. 6B is an enlarged view of portion 6B of FIG. 6A;

FIG. 7A is a left side elevation view of the hinge assembly and chassis of FIG. 3A, with the hinge assembly in the lowered position and having the overhang A;

FIG. 7B is a left side elevation view of the hinge assembly and chassis of FIG. 3A, with the hinge assembly in the lowered position and having an overhang C;

FIG. 7C is a left side elevation view of the hinge assembly and chassis of FIG. 3A, with the hinge assembly in the lowered position and having an overhang E;

FIG. 10A is a close-up perspective view taken from a top, front, left side of components of the cradle assembly and the actuator of FIG. 9;

FIG. 10B is a top plan view of the components of the cradle assembly of FIG. 9;

FIG. 10C is a front view of the components of the cradle assembly of FIG. 9;

FIG. 11A is a perspective view taken from a top, rear, left side of a cradle bushing of a set of cradle bushings of the system of FIG. 8;

FIG. 11B is a perspective view taken from a top, rear, left side of a cradle bushing of another set of cradle bushings of the system of FIG. 8;

FIG. 11C is a top plan view of the set of cradle bushings of FIG. 11A configured in a cradle bushing configuration and defining a cradle spacing I;

FIG. 11D is a top plan view of the set of cradle bushings of FIG. 11A configured in another cradle bushing configuration and defining a cradle spacing J;

FIG. 11E is a top plan view of the set of cradle bushings of FIG. 11B configured in a cradle bushing configuration and defining a cradle spacing K;

FIG. 11F is a top plan view of the set of cradle bushings of FIG. 11B configured in another cradle bushing configuration and defining a cradle spacing L;

FIG. 12 is a partially exploded, perspective view taken from a front, top, left side of a hoist bracket assembly of the system of FIG. 8, with a set of hoist bushings removably connected thereto;

FIG. 13A is a right side elevation view of a hoist bushing of the set of hoist bushings of FIG. 12;

FIG. 13B is a right side elevation view of the hoist bushing of FIG. 13A being turned upside down;

FIG. 13C is a right side elevation view of a hoist bushing of another set of hoist bushings;

FIG. 13D is a right side elevation view of a hoist bushing of yet another set of hoist bushings;

FIG. 14A is a top plan view of the hoist bracket assembly of FIG. 12, with the set of hoist bushings of FIG. 13A connected thereto and defining a hoist spacing M;

FIG. 14B is a top plan view of the hoist bracket assembly of FIG. 12, with the set of hoist bushings of FIG. 13B connected thereto and defining a hoist spacing N;

FIG. 14C is a top plan view of the hoist bracket assembly of FIG. 12, with the set of hoist bushings of FIG. 13C connected thereto and defining a hoist spacing O;

FIG. 14D is a top plan view of the hoist bracket assembly of FIG. 12, with the set of hoist bushings of FIG. 13D connected thereto and defining a hoist spacing P;

FIG. 19A is a cross-sectional view of the hoist bracket assembly of FIG. 17 taken along a horizontal cross-section plane, with the set of bushings of FIG. 18A being removably connected thereto and defining a hoist spacing Q;

FIG. 19B is a cross-sectional view of the hoist bracket assembly of FIG. 17 taken along a horizontal cross-section plane, with the set of bushings of FIG. 18B being removably connected thereto and defining a hoist spacing R; and FIG. 19C is a cross-sectional view of the hoist bracket assembly of FIG. 17 taken along a horizontal cross-section plane, with the set of bushings of FIG. 18C being removably connected thereto and defining a hoist spacing S.

DETAILED DESCRIPTION

Figure 1:
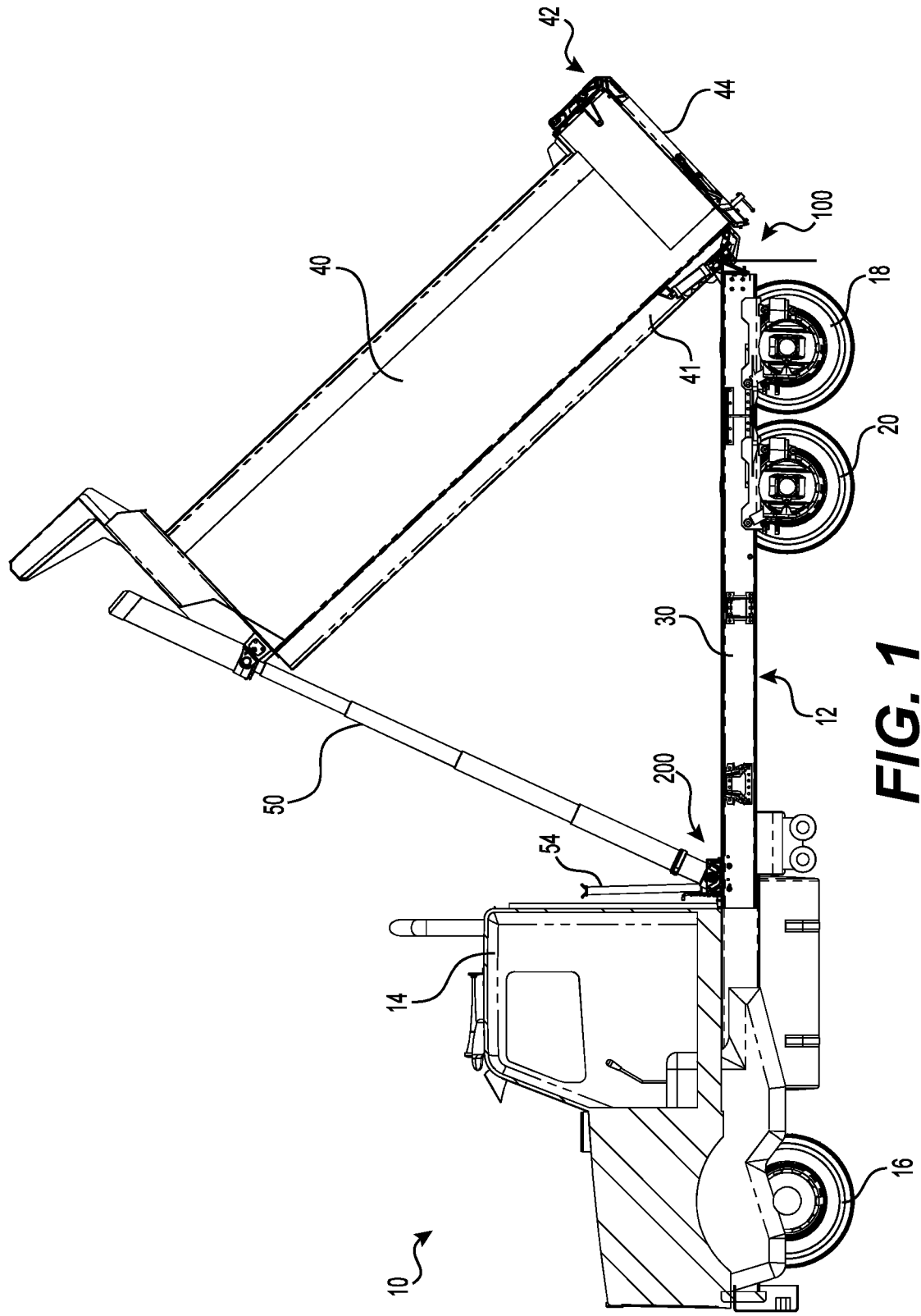
FIG. 1 is a left side elevation view of a truck having a chassis, a dump body pivotally connected to the chassis using a hinge assembly, and an actuator connected between the chassis and the dump body, with the dump body pivoted in a raised position by the actuator, and with the left front, intermediate and rear wheels removed.

FIG. 1 illustrates an embodiment of a truck 10. The truck 10 has a chassis 12. A cab 14 is connected to a front of the chassis 12. Two steerable front wheels 16 (only one of which is shown) are rotatably connected to the chassis 12 at a front thereof. Four rear wheels 18 (two on the right, two on the left, only one of which is shown) are rotatably connected to the chassis 12 at a rear thereof. Four intermediate wheels 20 (two on the right, two on the left, only one of which is shown) are rotatably connected to the chassis 12 at a position forward of the rear wheels 18. It is contemplated that the truck 10 could have more or less wheels than described above. The above description of a truck 10 is only one possible embodiment of a truck.

The chassis 12 includes left and right laterally spaced longitudinal support structures 30 (FIG. 2) that are adapted for supporting a dump body 40. The dump body 40 is pivotally connected to the left and right laterally spaced longitudinal support structures 30 of the chassis 12 using a hinge assembly 100. The hinge assembly 100 is secured to a floor 41 of the dump body 40 and is located at the rear end of the chassis 12. The dump body 40 has an opening (not shown) defined at a rear thereof. The opening provides access to an interior of the dump body 40. A door assembly 42 including a door 44, which in the present embodiment is a tailgate plate, is pivotally connected to the dump body 40. The door 44 selectively closes the opening, and thus selectively provides access to the interior of the dump body 40. The dump body 40 can pivot between a lowered position (shown in FIG. 5A) and a raised position (shown in FIG. 1). In the raised position, the dump body 40 can empty its content through the rear opening thereof when the door 44 is moved in an open position. An actuator 50 is pivotally connected between the chassis 12 and a front wall 46 of the dump body 40. The actuator 50 is interconnected between the chassis 12 and the dump body 40 using a system 200 that includes a cradle assembly 210 for connecting the actuator 50 to the chassis 12, and a hoist bracket assembly 300 for connecting the actuator 50 to the dump body 40. The actuator 50 can extend to pivot the dump body 40 to the raised position, and can retract to return the dump body 40 to the lowered position.

In accordance with an aspect of the present technology and with continuing reference to FIGS. 2 to 7C, the hinge assembly 100 pivotally connecting the dump body 40 to the left and right laterally spaced longitudinal support structures 30 of the chassis 12 will be described. Generally described, the hinge assembly 100 is removably connected to the chassis 12 of the truck 10 using fasteners, and provides for an adjustment of the overhang that the dump body 40 has relative to the chassis 12. The hinge assembly 100 includes left and right hinge pins 102, and left and right hinge brackets 120 adapted to be removably connected to the first and second laterally spaced longitudinal support structures 30 respectively. The hinge assembly 100 further includes left and right sills 140 adapted to be connected to the floor 41 of the dump body 40, and a cross plate 160 adapted to be removably connected between the left and right hinge brackets 120. The components of the hinge assembly 100 will now be described in more details.

Referring to FIGS. 3A to 4C, each hinge pin 102 has a flange 104 located at an end thereof. Each hinge pin 102 is part of a hinge pin assembly 106 (FIG. 3A) that includes the hinge pin 102, a hinge pin shim 108 and a hinge sleeve bearing 110. The hinge pin shim 108 and/or the hinge sleeve bearing 110 are optional in some embodiments. When present, the hinge pin shim 108 is disposed on the hinge pin 102, between the corresponding hinge bracket 120 and sill 140 as shown in FIGS. 3A and 4A. When present, the hinge sleeve bearing 110 is disposed on the hinge pin 102 as shown in FIGS. 3A and 4A.

The hinge assembly 100 is adapted to fit chassis 12 having different widths. Referring to FIG. 4A, when the hinge assembly 100 is removably connected to the chassis 12 having a width W1 and a longitudinal center plane 13, the left hinge pin shim 108 is disposed between the flange 104 of the left hinge pin 102 and the left sill 140. Similarly, the right hinge pin shim 108 is disposed between the flange 104 of the right hinge pin 102 and the right sill 140. Referring to FIG. 4B, the hinge assembly 100 is removably connected to a chassis 12' having a width W2 and a longitudinal center plane 13', and no hinge pin shim 108 is required. The left and right sills 140 are disposed inwardly towards the longitudinal center plane 13' of the chassis 12' compared to their position shown in FIG. 4A. Referring to FIG. 4C, the hinge assembly 100 is removably connected to a chassis 12" having a width W3 and a longitudinal center plane 13", and again no hinge pin shim 108 is required. The left and right sills 140 are disposed outwardly (i.e. away from the longitudinal center plane 13") compared to their position shown in FIG. 4B. The hinge pin assembly 106 is thus suited to adapt the hinge assembly 100 to chassis 12, 12', 12" of different widths W1, W2, W3. At least one of the left hinge pin shim 108, the right hinge pin shim 108, the left hinge sleeve bearing 110 and the right hinge sleeve bearing 110 is made of an aluminum and brass alloy, which promotes self-lubrication of the hinge assembly 100. Other materials could be used in other embodiments. It is also to be noted that the left hinge pin assembly 106 is identical to the right hinge pin assembly 106, but they could be different in other embodiments.

Referring back to FIGS. 3A to 3C, the left and right hinge brackets 120 are adapted for receiving the left and right hinge pins 102 and hinge sleeve bearings 110 respectively. Each of the left and right hinge brackets 120 has tabs 124 (FIG. 3A) through which the corresponding hinge pin 102 and hinge sleeve bearing 110 extend. The left and right hinge brackets 120 are a mirror image of one another, but it is to be noted that the left and right hinge brackets 120 could be structured and shaped otherwise in other embodiments. Each of the left and right hinge brackets 120 is adapted for receiving a fastener 126 extending through the flange 104 of the corresponding hinge pin 102. Thus, for example and as seen in FIG. 3A, the right hinge pin 102 is fastened to the right hinge bracket 120 via the fastener 126. The left and right fasteners 126 secure the left and right hinge pins 102 respectively to their corresponding hinge bracket 120 and prevent the unexpected disengagement therefrom.

Referring to FIGS. 3A and 3B, each of the left and right hinge brackets 120 defines a plurality of holes 130 matching a plurality of holes 32 defined in the support structures 30. Fasteners 132 extend through the holes 32, 130 and fasten the left and right hinge brackets 120 to the left and right laterally spaced longitudinal support structures 30 respectively. Each fastener 132 includes a bolt, a nut and lock washers. Each of the left and right hinge brackets 120 further defines a plurality of slotted holes 134 in a rear face thereof matching holes 162 defined in the cross plate 160. The left and right hinge brackets 120 are fastened to the cross plate 160 using a plurality of fasteners 136. Each fastener 136 of the plurality of fasteners 136 extends through a corresponding slotted hole 134 and a hole 162, and connects the cross plate 160 to the corresponding one of the left and right hinge brackets 120. Each fastener 136 includes a bolt, a nut and lock washers. The cross plate 160 is dimensioned for spanning laterally between the left and right laterally spaced longitudinal support structures 30. The cross plate 160 adds rigidity to the hinge assembly 100 and to the chassis 12, but could be omitted in some embodiments.

Figure 2:
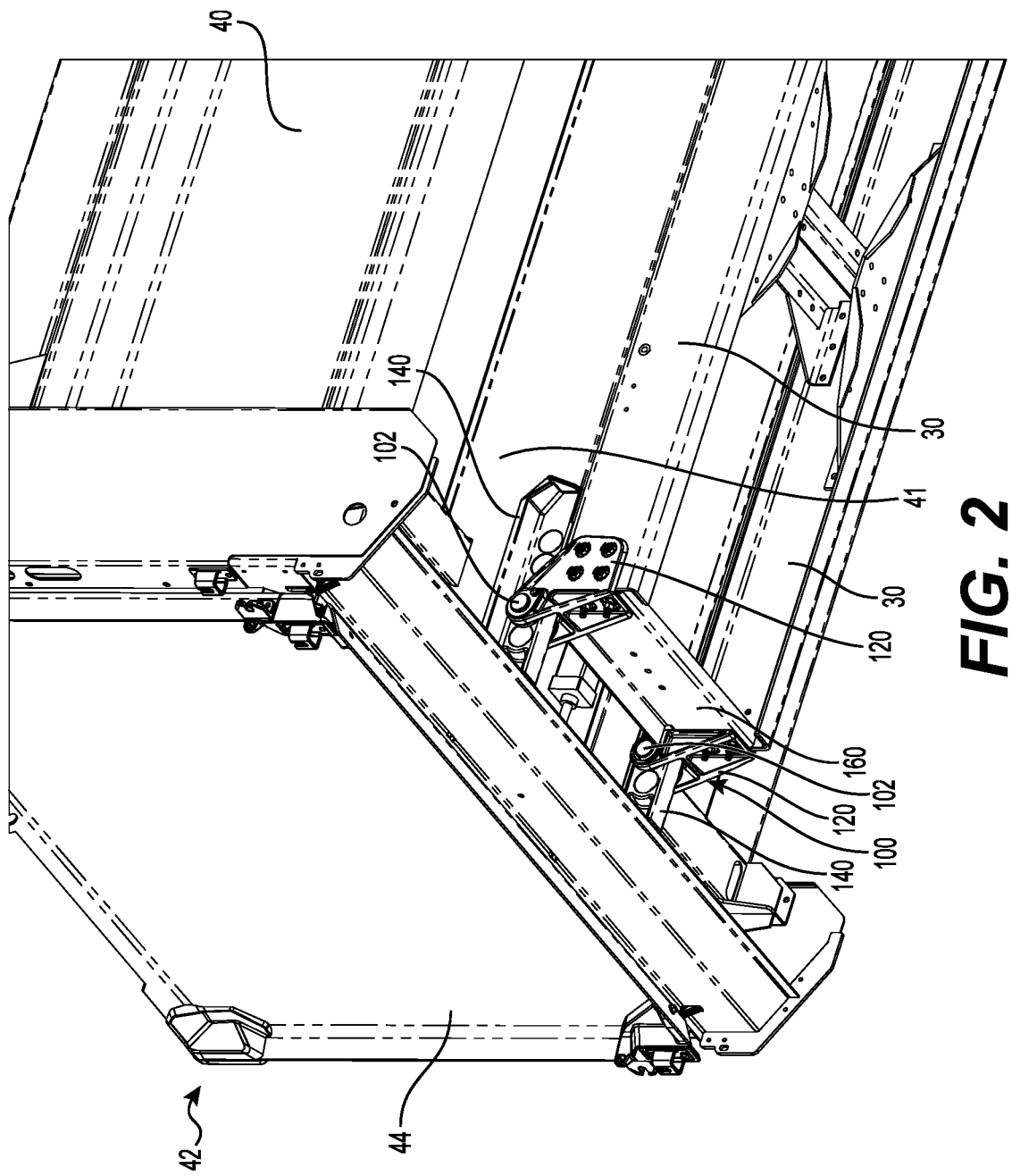
FIG. 2 is a perspective view taken from a rear, bottom, right side of the chassis, the dump body and the hinge assembly of FIG. 1, with the dump body pivoted in a lowered position.

Referring now to FIGS. 2 to 3C, the left and right sills 140 will be described. The left and right sills 140 are a mirror image of one another, but they could be shaped and dimensioned otherwise in other embodiments. The left and right sills 140 are connected to the floor 41 of the dump body 40 using suitable bonding techniques, such as welding. They could also be removably connected to the floor 41 in some embodiments, by using fasteners for example. Each of the left and right sills 140 defines five apertures $142a$, $142b$, $142c$, $142d$, $142e$ disposed in-line (aperture $142a$ is shown in FIGS. 7A to 7C). Each of the apertures $142a$, $142b$, $142c$, $142d$, $142e$ of the left and right sills 140 is dimensioned for receiving the corresponding hinge pin 102 and hinge sleeve bearing 110. In some embodiments, each of the apertures $142a$, $142b$, $142c$, $142d$, $142e$ of the left and right sills 140 is also dimensioned to provide some play between the hinge pin 102 and/or hinge sleeve bearing 110 so as to better align the dump body 40 with the chassis 12. Referring to FIGS. 3A-3C, 5A and 5B, the left and right hinge pins 102 are inserted in the apertures $142a$ of the left and right sills 140 respectively, and the dump body 40 has an overhang A (FIG. 5B). The overhang A is the longitudinal distance between a rear end $41a$ of the floor 41 and the center of the hinge pins 102 when disposed in the apertures $142a$ of the left and right sills 140. Referring to FIGS. 6A-6B, the left and right hinge pins 102 are inserted in the apertures $142d$ of the left and right sills 140 respectively, and the dump body 40 has an overhang D (FIG. 6B). The overhang D is the longitudinal distance between the rear end $41a$ of the floor 41 and the center of the hinge pins 102 when disposed in the apertures $142d$ of the left and right sills 140. The overhang D is greater than the overhang A.

The overhang of the dump body 40 can thus be selected by inserting the left and right hinge pins 102 in any one pair of apertures $142a$, $142b$, $142c$, $142d$, $142e$. Different overhangs are shown in FIGS. 7A to 7C. In FIG. 7A, the hinge pins 102 are inserted in the apertures $142a$ as in FIGS. 3A-3C, 5A and 5B, and the dump body 40 has the overhang A. In FIG. 7B, the hinge pins 102 are inserted in the apertures $142c$, and the dump body 40 has an overhang C that is longer than the overhang A, but shorter than the overhang D. In FIG. 7C, the hinge pins 102 are inserted in the apertures 142e, and the dump body 40 has an overhang E that is longer than the overhangs A, C and D. The hinge assembly 100 thus provides flexibility in the selection of the overhang of the dump body 40.

In accordance with another aspect of the present technology and with continuing reference to FIGS. 8 to 14B, the components of the system 200 for connecting the actuator 50 between the dump body 40 and the chassis 12 of the truck 10 will be described.

Figure 9:
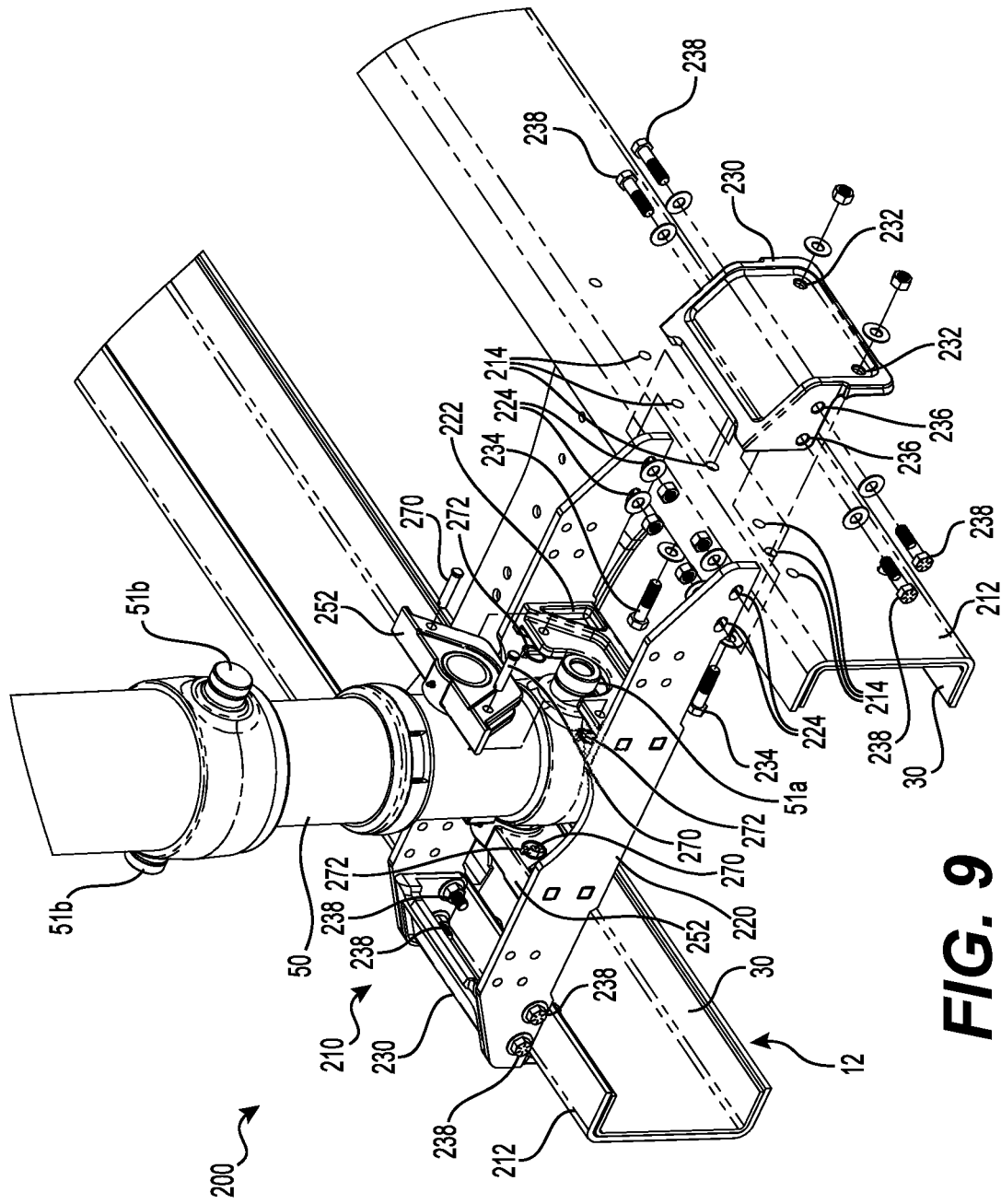
FIG. 9 is a partially exploded, perspective view taken from a top, front, left side of the chassis, the actuator and a cradle assembly of the system of FIG. 8.

Referring to FIG. 9, the cradle assembly 210 includes left and right reinforcing channels 212 adapted to receive therein the left and right laterally spaced longitudinal support structures 30 respectively. The reinforcing channels 212 have holes 214 defined therein matching holes (not shown) defined in the left and right laterally spaced longitudinal support structures 30.

Figure 8:
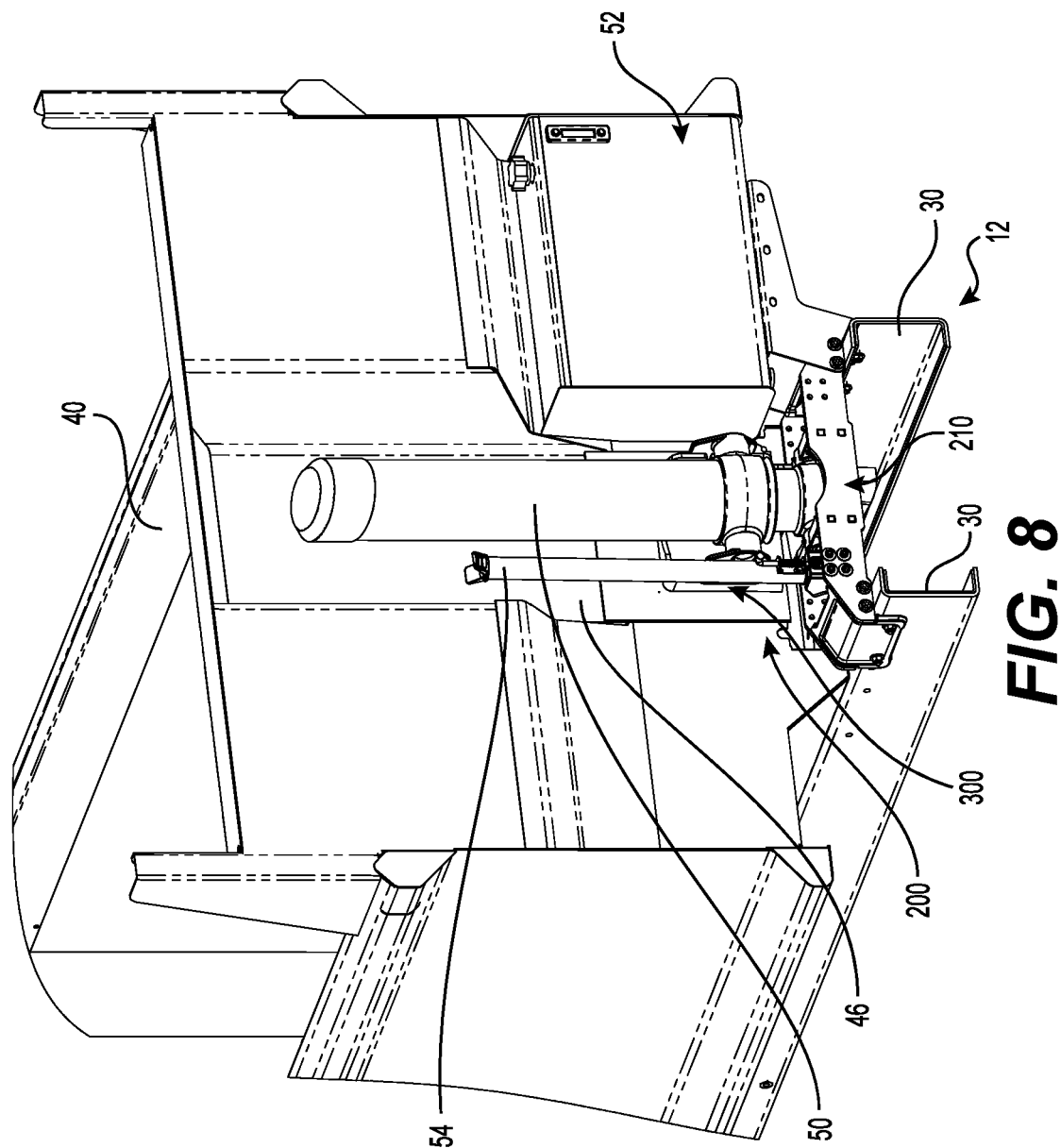
FIG. 8 is a perspective view taken from a front, top, right side of the dump body, the actuator, the chassis and the system of FIG. 1, with the dump body pivoted in the lowered position.

Referring to FIGS. 9 to 10C, the cradle assembly 210 further has a support frame 220 that is dimensioned for extending laterally between the left and right laterally spaced longitudinal support structures 30 of the chassis 12. More particularly, the support frame 220 of the present embodiment is dimensioned and structured to extend above the left and right laterally spaced longitudinal support structures 30 of the chassis 12, and above the left and right reinforcing channels 212. The support frame 220 has spaced apart left and right cradle bushing mounts 222 (only the left cradle bushing mount 222 is shown in FIG. 9). The cradle bushing mounts 222 extend parallel to the longitudinal support structures 30, but could extend otherwise in other embodiments. The support frame 220 further defines a plurality of slotted holes 224 on front and rear faces thereof. As seen in FIG. 8, the support frame 220 is adapted to support a hydraulic system 52 used for operating the actuator 50 when the actuator 50 is a hydraulic actuator. The support frame 220 is also adapted to support a safety holder 54 adapted for supporting the dump body 40.

The cradle assembly 210 further has left and right cradle attachment brackets 230 adapted to be removably connected to the left and right laterally spaced longitudinal support structures 30. More particularly, the left and right cradle attachment brackets 230 are adapted to be removably connected to the left and right reinforcing channels 212 and to the left and right laterally spaced longitudinal support structures 30. The left and right cradle attachment brackets 230 have holes 232 (FIG. 9) defined therein matching at least some of the holes 214 defined in the left and right reinforcing channels 212. The left cradle attachment bracket 230 is identical to the right cradle attachment bracket 230, but they could be shaped and dimensioned otherwise in other embodiments. As best seen in FIG. 9, a plurality of fasteners 234 extending through the holes 214, 232 removably connect the left cradle attachment bracket 230 simultaneously to the left reinforcing channel 212 and to the left support structure 30. Similarly, the right cradle attachment bracket 230 is also removably connected simultaneously to the right reinforcing channel 212 and to the right support structure 30 via fasteners 234 of the plurality of fasteners 234. Each fastener 234 includes a bolt, a nut and lock washers.

The left and right cradle attachment brackets 230 further have holes 236 defined therein matching the slotted holes 224 of the support frame 220. The support frame 220 is removably connected to the left and right cradle attachment brackets 230 using a plurality of fasteners 238. Each fastener 238 extends through a respective slotted hole 224 and a respective hole 236, and connects the support frame 220 to one of the left and right cradle attachment brackets 230. Each fastener 238 includes a bolt, a nut and lock washers. As seen in FIG. 8, the fasteners 238 can also be used to removably connect the hydraulic system 52 to the support frame 220. Since the fasteners 238 extend through the slotted holes 224, the positioning of the left and right cradle attachment brackets 230 relative to the support frame 220 can be selected based on the width of the chassis 12. Thus, the cradle assembly 210 is adapted to be removably connected not only to the chassis 12, but to chassis of different width, such as the chassis 12', 12" shown in FIGS. 4B and 4C.

Turning now to FIGS. 9, 10A, 11A to 11F, the cradle assembly 210 further includes two sets of cradle bushings 240, 250. The set of cradle bushings 240 includes left and right cradle bushings 242 (FIGS. 11A, 11C, 11D) that are removably connectable to the cradle bushing mounts 222 of the support frame 220 using a plurality of clevis pins 270 and a plurality of linchpins 272. Each cradle bushing 242 has a slot 243 (FIG. 11A) dimensioned for engaging one of the cradle bushing mounts 222, and for adequately positioning the cradle bushing 242 on the cradle bushing mount 222. Each cradle bushing 242 has an aperture 243a defined therein having a diameter 243b adapted for receiving cradle trunnions 51a of the actuator 50 (FIG. 9). The cradle trunnions 51a of actuator 50 shown in FIG. 9 are sized for the actuator 50 illustrated that is of 40 tons capacity. It is to be understood that cradle trunnions 51a of different size and configurations are used in an actuator of a different capacity. The clevis pins 270 and linchpins 272 provide quick and secure connection of the cradle bushings 242 to the cradle bushing mounts 222. In addition, a clevis pin 270 is not subjected to untightening issues that a bolt could have. The left and right cradle bushings 242 are identical, but could be different in other embodiments. Each of the left and right cradle bushings 242 has a first side 242a and a second side 242b. Generally described, the set of cradle bushings 240 is adapted to define two distinct cradle spacings I, J (FIGS. 11C and 11D) between the cradle bushings 242 for receiving the actuator 50 and for connecting the actuator 50 to the cradle assembly 210. More details in this regard will be provided below.

The set of cradle bushings 250 also includes left and right cradle bushings 252 (FIGS. 11B, 11E, 11F). Each cradle bushing 252 has a slot 253 dimensioned for engaging one of the cradle bushing mounts 222, and for adequately positioning the cradle bushing 252 on the cradle bushing mount 222. Each cradle bushing 252 has an aperture 253a defined therein having a diameter 253b adapted for receiving the cradle trunnions 51a (FIG. 9) of the actuator 50. The diameter 253b is larger than the diameter 243b. The cradle bushings 252 are also removably connectable to the cradle bushing mounts 222 of the support frame 220 using the same plurality of clevis pins 270 and plurality of linchpins 272 as described above. The left and right cradle bushings 252 are identical, but could be different in other embodiments. Each of the left and right cradle bushings 252 has a first side 252a and a second side 252b. Similarly, the set of cradle bushings 250 is adapted to define two distinct cradle spacings K, L (FIGS. 11E and 11F) between the cradle bushings 252 for receiving the actuator 50 and for connecting the actuator 50 to the cradle assembly 210. More details in this regard will be provided below.

The selection of the set of cradle bushings 240, 250 and the configuration of the cradle bushings 242, 252 is based on the actuator 50 that is to be connected to the cradle assembly 210. The details of the connection and configuration of each set of cradle bushings 240, 250 will now be described.

Referring to FIGS. 11A, 11C and 11D, the set of cradle bushings 240 is adapted for connecting an actuator 50 of 8-24 tons capacity, or an actuator 50 of 30 tons capacity to the support frame 220. Referring to FIG. 11C, when an actuator 50 of 8-24 tons capacity is selected, the left and right cradle bushings 242 of the set of cradle bushings 240 are disposed in a cradle bushing configuration 244a where (i) the first side 242a of the left cradle bushing 242 faces towards the first side 242a of the right cradle bushing 242, and (ii) the second side 242b of the left cradle bushing 242 faces away from the second side 242b of the right cradle bushing 242. The cradle spacing I is defined between the first side 242a of the left cradle bushing 242 and the first side 242a of the right cradle bushing 242. Once the left and right cradle bushings 242 are connected to the cradle trunnions 51a of the actuator 50, the left and right cradle bushings 242 are engaged to the left and right cradle bushing mounts 222 respectively, and connected thereto using the clevis pins 270 and linchpins 272. The actuator 50 of 8-24 tons capacity is thus connected to the chassis 12 via the cradle assembly 210.

Referring to FIG. 11D, when an actuator 50 of 30 tons capacity is selected, the left and right cradle bushings 242 of the set of cradle bushings 240 are disposed in a cradle bushing configuration 244b where (i) the first side 242a of the left cradle bushing 242 faces away from the first side 242a of the right cradle bushing 242, and (ii) the second side 242b of the left cradle bushing 242 faces towards the second side 242b of the right cradle bushing 242. In other words, each of the left and right cradle bushings 242 is rotated 180 degrees about a vertically extending axis (projecting from the page containing FIGS. 11A to 11F) from its orientation in the cradle bushing configuration 244a (FIG. 11C) to reach the cradle bushing configuration 244b (FIG. 11D). The cradle spacing J is defined between the second side 242b of the left cradle bushing 242 and the second side 242b of the right cradle bushing 242. The cradle spacing J is greater than the cradle spacing I for receiving the actuator 50 of 30 tons capacity, which is larger than the actuator 50 of 8-24 tons capacity. Once the left and right cradle bushings 242 are connected to the cradle trunnions 51a of the actuator 50, the left and right cradle bushings 242 are engaged to the left and right cradle bushing mounts 222 respectively, and connected thereto using the clevis pins 270 and linchpins 272. The actuator 50 of 30 tons capacity is thus connected to the chassis 12 via the cradle assembly 210.

Referring to FIGS. 11B, 11E and 11F, the set of cradle bushings 250 is adapted for connecting an actuator 50 of 40 tons capacity, or an actuator 50 of 50 tons capacity to the support frame 220. Referring to FIGS. 9, 10A, 10B and 11E, when an actuator 50 of 40 tons capacity is selected (the actuator 50 shown in FIG. 9 has a 40 tons capacity), the left and right cradle bushings 252 of the set of cradle bushings 250 are disposed in a cradle bushing configuration 254a where (i) the first side 252a of the left cradle bushing 252 faces towards the first side 252a of the right cradle bushing 252, and (ii) the second side 252b of the left cradle bushing 252 faces away from the second side 252b of the right cradle bushing 252. The cradle spacing K is defined between the first side 252a of the left cradle bushing 252 and the first side 252a of the right cradle bushing 252. The cradle spacing K is greater than the cradle spacings I, J. Once the left and right cradle bushings 252 are connected to the cradle trunnions 51a of the actuator 50, the left and right cradle bushings 252 are engaged to the left and right cradle bushing mounts 222 respectively, and connected thereto using the clevis pins 270 and linchpins 272. The actuator 50 of 40 tons capacity is thus connected to the chassis 12 via the cradle assembly 210.

Referring to FIG. 11F, when an actuator 50 of 50 tons capacity is selected, the left and right cradle bushings 252 of the set of cradle bushings 250 are disposed in a cradle bushing configuration 254b where (i) the first side 252a of the left cradle bushing 252 faces away from the first side 252a of the right cradle bushing 252, and (ii) the second side 252b of the left cradle bushing 252 faces towards the second side 252b of the right cradle bushing 252. In other words, each of the left and right cradle bushings 252 is rotated 180 degrees about a vertically extending axis (projecting from the page containing FIGS. 11A to 11F) from its orientation in cradle bushing configuration 254a (FIG. 11E) to reach cradle bushing configuration 254b (FIG. 11F). The cradle spacing L is defined between the second side 252b of the left cradle bushing 252 and the second side 252b of the right cradle bushing 252. The cradle spacing L is greater than the cradle spacings I, J, K. Once the left and right cradle bushings 252 are connected to the cradle trunnions 51a of the actuator 50, the left and right cradle bushings 252 are engaged to the left and right cradle bushing mounts 222 respectively, and connected thereto using the clevis pins 270 and linchpins 272. The actuator 50 of 50 tons capacity is thus connected to the chassis 12 via the cradle assembly 210.

It is to be noted that although the actuator 50 and the sets of cradle bushings 240, 250 illustrated in the accompanying Figures are adapted for a trunnion type connection with the actuator 50, it is contemplated that the sets of cradle bushings 240, 250 could be adapted to for a pin-to-pin type connection with another actuator.

Turning now to FIGS. 12 to 14D, the hoist bracket assembly 300 will now be described. The hoist bracket assembly 300 includes a base plate 310 adapted to be connected to the dump body 40. More particularly, the base plate 310 is adapted to be connected to the front wall 46 of the dump body 40. The base plate 310 is connected to the front wall 46 of the dump body 40 using suitable bonding techniques, such as welding. It is contemplated that the base plate 310 could be fastened to the front wall 46 of the dump body 40 in other embodiments. A bracket 320 is adapted to be connected to the base plate 310. The bracket 320 is also connected to the base plate 310 using suitable bonding techniques, such as welding. It is contemplated that the bracket 320 could be fastened to the base plate 310 in other embodiments. The bracket 320 has left and right hoist bushing mounts 322 each defining a receiving cavity 324 (only the receiving cavity 324 of the left hoist bushing mount 322 is shown in FIG. 12).

The hoist bracket assembly 300 further includes three sets of hoist bushings 340, 350, 360. The set of hoist bushings 340 includes left and right hoist bushings 342 (FIGS. 12, 13A, 13B, 14A, 14B). Each hoist bushing 342 has a projection 346 dimensioned for being received in the receiving cavity 324. Holes 347 are defined in the projection 346. A sleeve 348 is also removably connected to each hoist bushing 342. In some embodiments, the sleeve 348 is also made of an aluminum and brass alloy to promote self-lubrication between the actuator 50 and the hoist bushing 342. The sleeve 348 has an internal diameter 348a adapted for receiving one of the hoist trunnions 51b of the actuator 50 (FIG. 9). Each hoist bushing 342 is removably connectable to one of the hoist bushing mounts 322 of the bracket 320 upon inserting at least partially the hoist bushing 342 inside the receiving cavity 324, and using a fastener 370 and a pin 372 connected to a locking plate 374. The fastener 370 and the pin 372 are dimensioned to be received in corresponding holes 347 defined in the projection 346. A linchpin 376 secures the locking plate 374 to the bracket 320, thus securing the hoist bushing 342 inside receiving cavity 324. The fastener 370, the locking plate 374 and the linchpin 376 provide quick and secure connection of the hoist bushing 342 to the hoist bushing mount 322. The left and right hoist bushings 342 are a mirror image of one another, but could be shaped and dimensioned otherwise in other embodiments. Each of the left and right hoist bushings 342 has a first side 342a and a second side 342b. Generally described, the set of hoist bushings 340 is adapted to define two distinct hoist spacings M, N (FIGS. 14A and 14B) between the hoist bushings 342 for receiving the actuator 50 and for connecting the actuator 50 to the hoist bracket assembly 300.

Referring to FIGS. 13C and 14C, the set of hoist bushings 350 includes left and right hoist bushings 352. Each hoist bushing 352 also has the projection 346 dimensioned for being received in the receiving cavity 324, and holes 347 defined in the projection 346. A sleeve 358 is also removably connected to each hoist bushing 352. The sleeve 358 has an internal diameter 358a adapted for receiving one of the hoist trunnions 51b of the actuator 50. The internal diameter 358a is smaller than the internal diameter 348a. Each hoist bushing 352 is removably connectable to one of the hoist bushing mounts 322 of the bracket 320 using the same fastener 370, locking plate 374 and linchpin 376 as described above. The left and right hoist bushings 352 are a mirror image of one another, but could be shaped and dimensioned otherwise in other embodiments. Generally described, the set of hoist bushings 350 is adapted to define a hoist spacing O (FIG. 14C) between the hoist bushings 352 for receiving the actuator 50 and for connecting the actuator 50 to the hoist bracket assembly 300.

Referring to FIGS. 13D and 14D, the set of hoist bushings 360 includes left and right hoist bushings 362. Each hoist bushing 362 also has the projection 346 dimensioned for being received in the receiving cavity 324, and holes 347 defined in the projection 346. A sleeve 368 is also removably connected to each hoist bushing 362. The sleeve 368 has an internal diameter 368a adapted for receiving one of the hoist trunnions 51b of the actuator 50. The internal diameter 368a is smaller than the internal diameter 348a, and is the same as the internal diameter 358a. Each hoist bushing 362 is removably connectable to one of the hoist bushing mounts 322 of the bracket 320 using the same fastener 370, locking plate 374 and linchpin 376 as described above. The left and right hoist bushings 362 are a mirror image of one another, but could be shaped and dimensioned otherwise in other embodiments. Generally described, the set of hoist bushings 360 is adapted to define a hoist spacing P (FIG. 14D) between the hoist bushings 362 for receiving the actuator 50 and for connecting the actuator 50 to the hoist bracket assembly 300.

The selection of the set of hoist bushings 340, 350, 360, and the configuration of the hoist bushings 342 of the set of hoist bushings 340, is based on the actuator 50 that is to be connected to the hoist bracket assembly 300. The details of the connection and configuration of each set of hoist bushings 340, 350, 360 will now be described.

Referring to FIGS. 12, 13A, 13B, 14A and 14B, the set of hoist bushings 340 is adapted for connecting an actuator 50 of 40 tons capacity, or an actuator 50 of 50 tons capacity to the hoist bracket assembly 300. Referring to FIGS. 12, 13A and 14A, when an actuator 50 of 40 tons capacity is selected, the left and right hoist bushings 342 of the set of hoist bushings 340 are disposed in a hoist bushing configuration 344a where (i) the first side 342a of the left hoist bushing 342 faces towards the first side 342a of the right hoist bushing 342, and (ii) the second side 342b of the left hoist bushing 342 faces away from the second side 342b of the right hoist bushing 342. The hoist spacing M is defined between the first side 342a of the left hoist bushing 342 and the first side 342a of the right hoist bushing 342. Once the left and right hoist bushings 342 are connected to the hoist trunnions 51b of the actuator 50, the left and right hoist bushings 342 are inserted in the left and right hoist bushing mounts 322 respectively, and connected thereto using the fastener 370, locking plate 374 and linchpin 376. The actuator 50 of 40 tons capacity is thus connected to the dump body 40 via the hoist bracket assembly 300.

Referring to FIGS. 13B and 14B, when an actuator 50 of 50 tons capacity is selected, the left and right hoist bushings 342 of the set of hoist bushings 340 are disposed in a hoist bushing configuration 344b where (i) the first side 342a of the left hoist bushing 342 faces away from the first side 342a of the right hoist bushing 342, and (ii) the second side 342b of the left hoist bushing 342 faces towards the second side 342b of the right hoist bushing 342. In other words, each of the left and right hoist bushings 342 is rotated upside-down from its orientation in the hoist bushing configuration 344a (FIG. 14A) to reach the hoist bushing configuration 344b (FIG. 14B). The hoist spacing N is defined between the second side 342b of the left hoist bushing 342 and the second side 342b of the right hoist bushing 342. The hoist spacing N is greater than the hoist spacing M. Once the left and right hoist bushings 342 are connected to the hoist trunnions 51b of the actuator 50, the left and right hoist bushings 342 are inserted in the left and right hoist bushing mounts 322 respectively, and connected thereto using the fastener 370, locking plate 374 and linchpin 376. The actuator 50 of 50 tons capacity is thus connected to the dump body 40 via the hoist bracket assembly 300.

Referring to FIGS. 13C and 14C, the set of hoist bushings 350 is adapted for connecting an actuator 50 of 30 tons capacity to the hoist bracket assembly 300. When an actuator 50 of 30 tons capacity is selected, the left and right hoist bushings 352 are connected to the hoist trunnions 51b of the actuator 50. The hoist spacing O is defined between the left and right hoist bushings 352. The hoist spacing O is smaller than the hoist spacings M, N. The left and right hoist bushings 352 are then inserted in the left and right hoist bushing mounts 322 respectively, and connected thereto using the fastener 370, locking plate 374 and linchpin 376. The actuator 50 of 30 tons capacity is thus connected to the dump body 40 via the hoist bracket assembly 300.

Referring to FIGS. 13D and 14D, the set of hoist bushings 360 is adapted for connecting an actuator 50 of 8-24 tons capacity to the hoist bracket assembly 300. When an actuator 50 of 8-24 tons capacity is selected, the left and right hoist bushings 362 are connected to the hoist trunnions 51b of the actuator 50. The hoist spacing P is defined between the left and right hoist bushings 362. The hoist spacing P is smaller than the hoist spacings M, N, O. The left and right hoist bushings 362 are then inserted in the left and right hoist bushing mounts 322 respectively, and connected thereto using the fastener 370, locking plate 374 and linchpin 376. The actuator 50 of 8-24 tons capacity is thus connected to the dump body 40 via the hoist bracket assembly 300.

Illustrative scenarios are now provided to describe the steps required for connecting an actuator 50 between the dump body 40 and the chassis 12 of the truck 10 using the system 200. The order of the steps recited herein is not intended to be limiting.

First and as illustrated in FIG. 9, the cradle assembly 210 is removably connected to the chassis 12 by connecting the support frame 220 to the left and right laterally spaced longitudinal support structures 30 using the cradle attachment brackets 230 and the plurality of fasteners 234, 238.

Second, the hoist bracket assembly 300 is connected to the dump body 40.

Third, when an actuator 50 of 40 tons capacity is selected, the actuator 50 is connected to the cradle assembly 210 by first connecting the left and right cradle bushings 252 to the cradle trunnions 51a in the cradle bushing configuration 254a (FIG. 11E) for defining the cradle spacing K, and then by engaging and securing the left and right cradle bushings 252 to the cradle bushing mounts 222.

Fourth, and still when the actuator 50 of 40 tons capacity is selected, the actuator 50 is connected to the hoist bracket assembly 300 by first connecting the left and right hoist bushings 342 to the hoist trunnions 51b in the hoist bushing configuration 344a (FIGS. 12 and 14A) for defining the hoist spacing M, and then by inserting and securing the left and right hoist bushings 342 to the left and right hoist bushing mounts 322.

Should an actuator 50 of 50 tons capacity be desired in replacement of the actuator 50 of 40 tons capacity described above, the actuator 50 of 40 tons capacity is first disconnected from the dump body 40 by disengaging the left and right hoist bushings 342 from the hoist bushing mounts 322 after having removed the fasteners 370, locking plates 374 and linchpins 376. The left and right hoist bushings 342 are removed form the hoist trunnions 51b, turned upside-down, and re-engaged to the hoist trunnions 51b of the actuator 50 of 50 tons capacity in the hoist bushing configuration 344b (FIG. 14B) for defining the hoist spacing N. The left and right hoist bushings 342 are then re-inserted in the hoist bushing mounts 322 and connected thereto using the fasteners 370, locking plates 374 and linchpins 376. Then, the cradle bushings 252 are disconnected from the cradle bushing mounts 222, and removed from the cradle trunnions 51a of the actuator of 40 tons capacity. The left and right cradle bushings 252 are then pivoted 180 degrees, re-engaged to the cradle trunnions 51a of the actuator 50 of 50 tons capacity in the cradle bushing configuration 254b (FIG. 11F) for defining the cradle spacing L. The left and right cradle bushings 252 are then re-engaged and secured to the cradle bushing mounts 222 using the clevis pins 270 and linchpins 272. The actuator 50 of 50 tons capacity is thus connected to the cradle assembly 210 and to the hoist bracket assembly 300.

Should an actuator 50 of 30 tons capacity be desired in replacement of the actuator of 50 tons capacity described above, the actuator 50 of 50 tons capacity is first disconnected from the dump body 40 by disengaging the left and right hoist bushings 342 from the hoist bushing mounts 322 after having removed the fasteners 370, locking plates 374 and linchpins 376. The actuator 50 or 50 tons capacity is then disconnected from the chassis 12 by disconnecting the left and right cradle bushings 252 from the cradle bushing mounts 222 after having removed the clevis pins 270 and linchpins 272.

The left and right cradle bushings 242 are engaged to the cradle trunnions 51a of the actuator 50 of 30 tons capacity in the cradle bushing configuration 244b (FIG. 11D) for defining the cradle spacing J. The left and right hoist bushings 352 are engaged to the hoist trunnions 51b of the actuator 50 of 30 tons capacity for defining the hoist spacing O. The left and right cradle bushings 242 are then engaged to the cradle bushing mounts 222 and connected thereto using the clevis pins 270 and linchpins 272. The left and right hoist bushings 352 are then inserted in the hoist bushing mounts 322 and connected thereto using the fasteners 370, locking plates 374 and linchpins 376. The actuator 50 of 30 tons capacity is thus connected to the cradle assembly 210 and to the hoist bracket assembly 300.

The system 200 of the present technology promotes the interchangeability of the actuator 50 that is operatively connected between the dump body 40 and the chassis 12, and thus provides truck manufacturers and users with flexibility regarding the choice of actuator 50 depending on the needs and/or specifications. In addition, the system 200 facilitates the replacement of the actuator 50 that is operatively connected between the dump body 40 and the chassis 12 should servicing be needed.

Referring now to FIGS. 15 to 19C, a system 1200 for connecting the actuator 50 between the dump body 40 and the chassis 12, being an alternative embodiment of the system 200, will be described. The system 1200 includes elements that are the same as or similar to those described with reference to the system 200. Therefore, for simplicity, elements of the system 1200 that are the same as or similar to those of the system 200 have been labeled with the same reference numerals, but with the reference numeral prefixed by a "1" (for example, the cradle assembly 210 of the system 200 is the cradle assembly 1210 in the system 1200), and will not be described again in detail.

Figure 15:
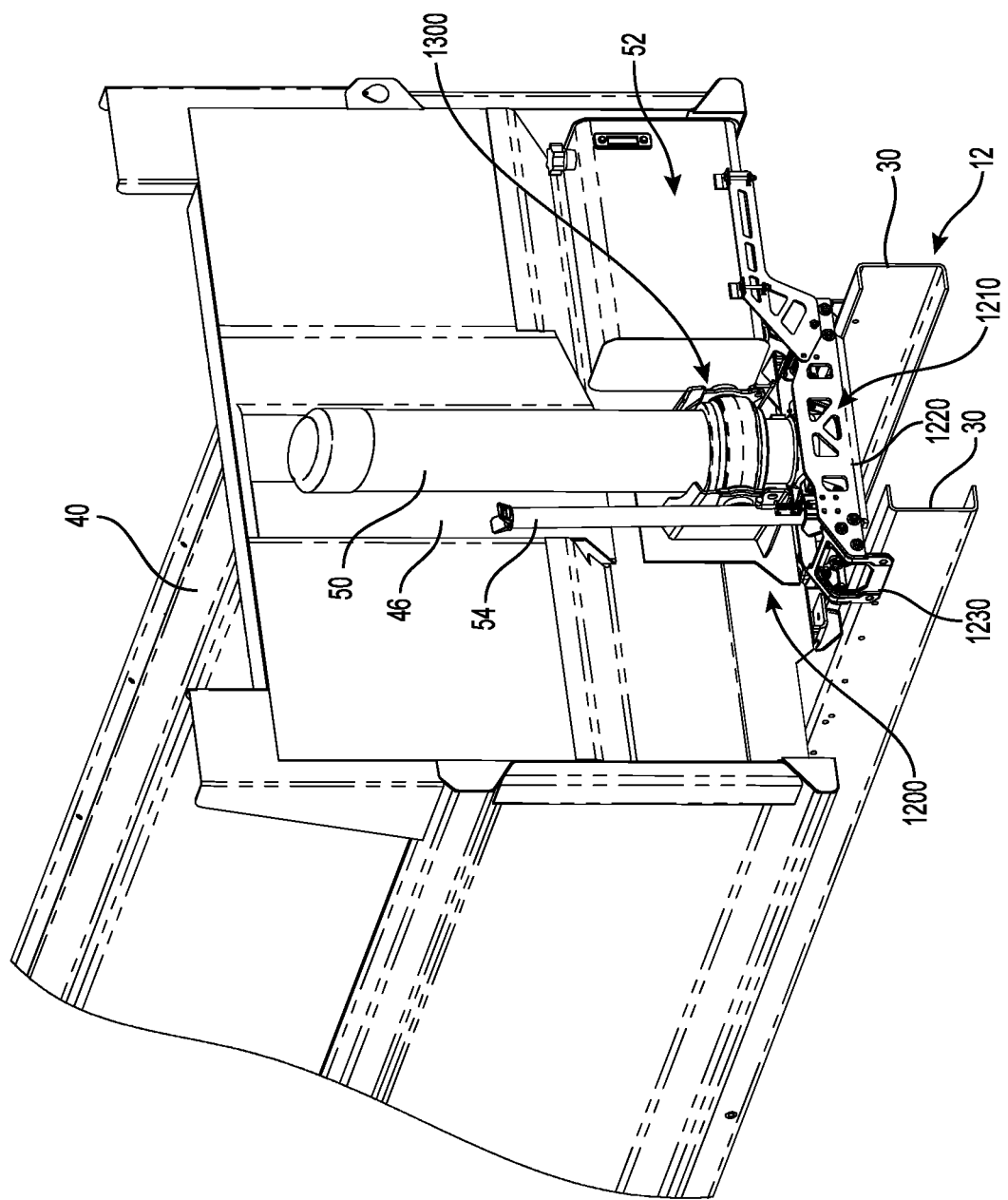
FIG. 15 is a perspective view taken from a front, top, right side of the dump body, the actuator, the chassis and an alternative embodiment of the system of FIG. 1, with the dump body pivoted in the lowered position.

Referring to FIG. 15, the system 1200 includes a cradle assembly 1210 in which the support frame 1220, the left and right cradle attachment brackets 1230 (only the right cradle attachment bracket 1230 is shown) have apertures defined therein. The cradle assembly 1210 has the same features as the cradle assembly 210, and supports the safety holder 54 on the right side of the actuator 50.

Figure 17:
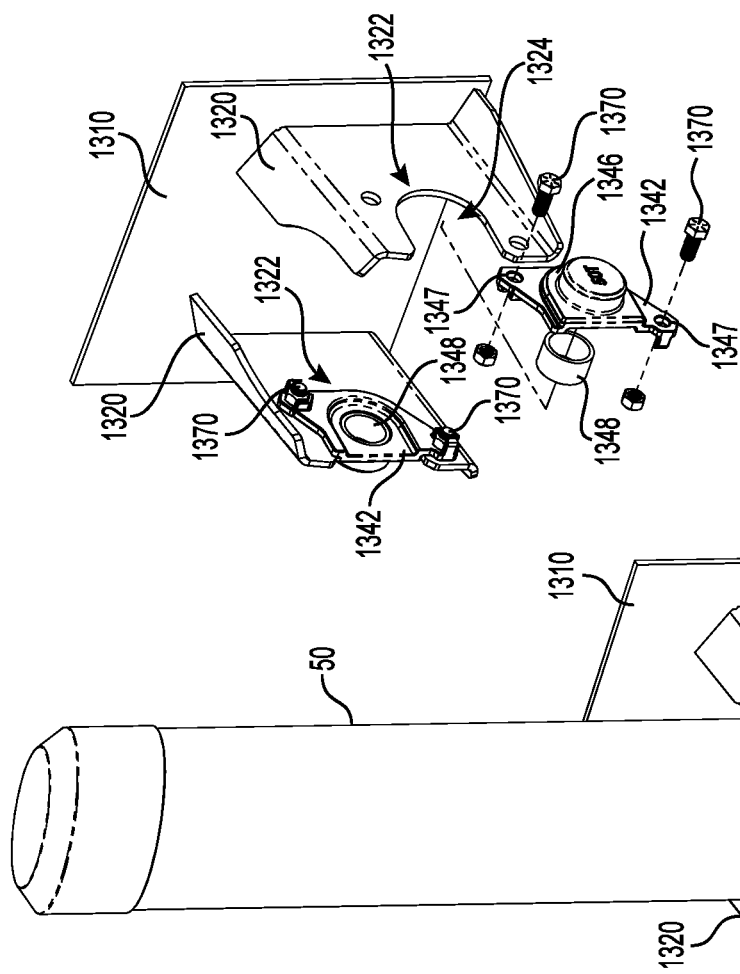
FIG. 17 is a partially exploded, perspective view taken from a front, top, left side of the hoist bracket assembly of the system of FIG. 15, with a set of hoist bushings removably connected thereto.
Figure 16:
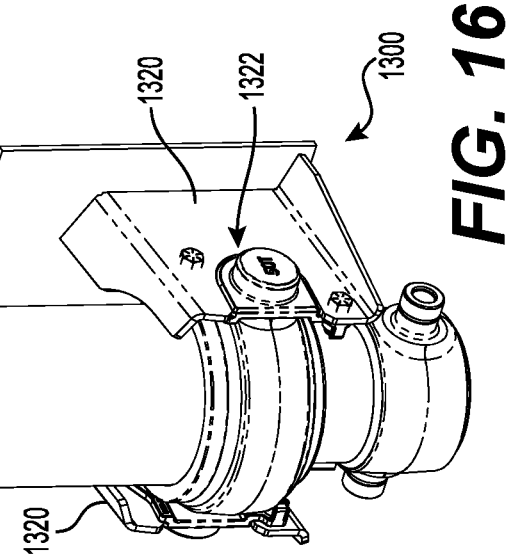
FIG. 16 is a perspective view taken from a front, top, left side of the actuator and hoist bracket assembly of the system of FIG. 15, with the actuator being in the retracted position.

Referring to FIGS. 16 and 17, the system 1200 includes a hoist bracket assembly 1300 having left and right brackets 1320 connected to the base plate 1310. Each of the left and right brackets 1320 defines a hoist bushing mount 1322 having a receiving recess 1324 (only the receiving recess 1324 of the left bracket 1320 is shown in FIG. 17). The hoist bracket assembly 1300 includes three sets of hoist bushings 1340, 1350, 1360. The set of hoist bushings 1340 includes left and right hoist bushings 1342. Each hoist bushing 1342 has a D-shaped projection 1346 dimensioned for being received in the receiving recess 1324. Holes 1347 are defined in the hoist bushings 1342. A sleeve 1348 is also removably connected to each hoist bushing 1342. The sleeve 1348 has an internal diameter 1348a adapted for receiving one of the hoist trunnions 51b of the actuator 50. Each hoist bushing 1342 is removably connectable to a corresponding one of the brackets 1320 upon inserting the projection 1346 in the receiving recess 1324 and using fasteners 1370 (in this embodiment, bolts and nuts). The fastened connection of the hoist bushing 1342 to the corresponding bracket 1320 provides quick and secure connection of the hoist bushings 1342 to the left and right brackets 1320. The left and right hoist bushings 1342 are a mirror image of one another, but could be shaped and dimensioned otherwise in other embodiments. In contrast with the set of hoist bushings 340, the set of hoist bushings 1340 is adapted to define only one hoist spacing Q (FIG. 19A) between the hoist bushings 1342 for receiving the actuator 50 and for connecting the actuator 50 to the hoist bracket assembly 1300.

Figure 18A:
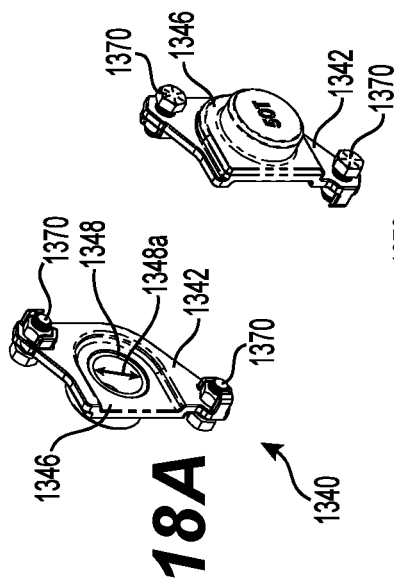
FIG. 18A is a perspective view taken from a front, top, left side of the set of hoist bushings of FIG. 17.
Figure 18B:
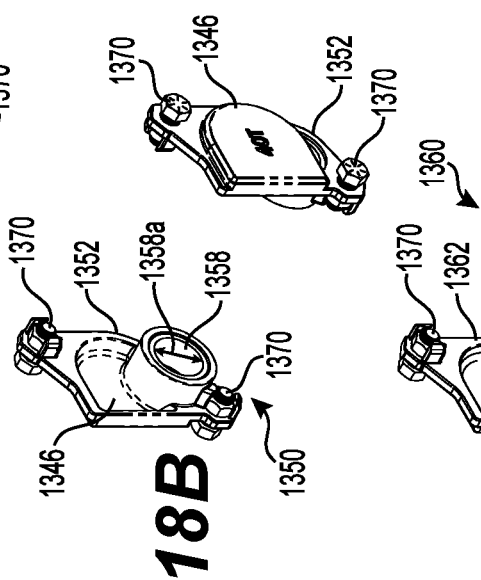
FIG. 18B is a perspective view taken from a front, top, left side of another set of hoist bushings.

Referring to FIGS. 18B and 19B, the set of hoist bushings 1350 includes left and right hoist bushings 1352. Each hoist bushing 1352 also has the projection 1346 dimensioned for being received in the receiving recess 1324, and holes defined therein. A sleeve 1358 is also removably connected to each hoist bushing 1352. The sleeve 1358 has an internal diameter 1358a (FIG. 18B) adapted for receiving one of the hoist trunnions 51b of the actuator 50. The internal diameter 1358a is smaller than the internal diameter 1348a. Each hoist bushing 1352 is removably connectable to one of the hoist bushing mounts 1322 using the same fasteners 1370 as described above. The left and right hoist bushings 1352 are a mirror image of one another, but could be shaped and dimensioned otherwise in other embodiments. Generally described, the set of hoist bushings 1350 is adapted to define a hoist spacing R (FIG. 19B) between the hoist bushings 1352 for receiving the actuator 50 and for connecting the actuator 50 to the hoist bracket assembly 1300.

Figure 18C:
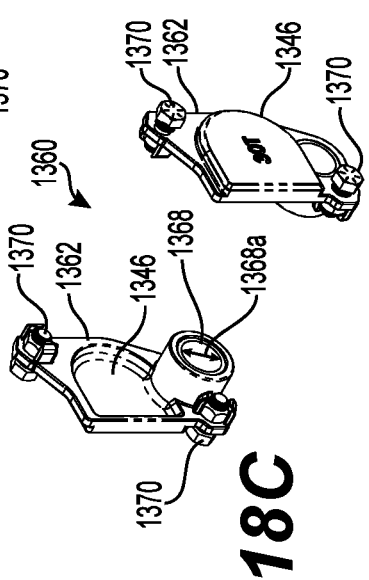
FIG. 18C is a perspective view taken from a front, top, left side of yet another set of hoist bushings.

Referring to FIGS. 18C and 19C, the set of hoist bushings 1360 includes left and right hoist bushings 1362. Each hoist bushing 1362 also has the projection 1346 dimensioned for being received in the receiving recess 1324, and holes defined therein. A sleeve 1368 is also removably connected to each hoist bushing 1362. The sleeve 1368 has an internal diameter 1368a (FIG. 18C) adapted for receiving one of the hoist trunnions 51b of the actuator 50. The internal diameter 1368a is smaller than the internal diameters 1348a, 1358a. Each hoist bushing 1362 is removably connectable to one of the hoist bushing mounts 1322 using the same fasteners 1370 as described above. The left and right hoist bushings 1362 are a mirror image of one another, but could be shaped and dimensioned otherwise in other embodiments. Generally described, the set of hoist bushings 1360 is adapted to define a hoist spacing S (FIG. 19C) between the hoist bushings 1362 for receiving the actuator 50 and for connecting the actuator 50 to the hoist bracket assembly 1300.

The selection of the set of hoist bushings 1340, 1350, 1360 is based on the actuator 50 that is to be connected to the hoist bracket assembly 1300. In this embodiment, the set of hoist bushings 1340 is adapted for connecting an actuator 50 of 50 tons capacity, the set of hoist bushings 1350 is adapted for connecting an actuator 50 of 40 tons capacity, and the set of hoist bushings 1360 is adapted for connecting an actuator 50 of 30 tons capacity.

When an actuator 50 of 50 tons capacity is selected, the left and right hoist bushings 1342 are connected to the hoist trunnions 51b of the actuator 50. The hoist spacing Q is defined between the left and right hoist bushings 1342. The hoist spacing Q is larger than the hoist spacings R, S. The left and right hoist bushings 1342 are then inserted in the left and right hoist bushing mounts 1322 respectively, and connected thereto using the fasteners 1370. The actuator 50 of 50 tons capacity is thus connected to the dump body 40 via the hoist bracket assembly 1300.

When an actuator 50 of 40 tons capacity is selected, the left and right hoist bushings 1352 are connected to the hoist trunnions 51b of the actuator 50. The hoist spacing R is defined between the left and right hoist bushings 1352. The hoist spacing R is larger than the hoist spacing S and smaller than the hoist spacing Q. The left and right hoist bushings 1352 are then inserted in the left and right hoist bushing mounts 1322 respectively, and connected thereto using the fasteners 1370. The actuator 50 of 40 tons capacity is thus connected to the dump body 40 via the hoist bracket assembly 1300.

When an actuator 50 of 30 tons capacity is selected, the left and right hoist bushings 1362 are connected to the hoist trunnions 51b of the actuator 50. The hoist spacing S is defined between the left and right hoist bushings 1362. The hoist spacing Q is smaller than the hoist spacings Q, R. The left and right hoist bushings 1362 are then inserted in the left and right hoist bushing mounts 1322 respectively, and connected thereto using the fasteners 1370. The actuator 50 of 30 tons capacity is thus connected to the dump body 40 via the hoist bracket assembly 1300.

The system 1200 of the present technology also promotes the interchangeability of the actuator 50 that is operatively connected between the dump body 40 and the chassis 12 of the truck 10. The selection of the system 200, 1200 can be based on the make and model of the selected actuator 50, and it is contemplated that other embodiments of the system 200, 1200 could exist to accommodate various makes and models of actuators 50.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A system for connecting an actuator between a dump body and a chassis of a truck, the dump body being pivotally connected to the chassis of the truck, the system comprising:
   a cradle assembly for connecting the actuator to the chassis, the cradle assembly being adapted to be removably connected to the chassis;
   a hoist bracket assembly for connecting the actuator to the dump body; and
   the cradle assembly including a set of bushings being configurable in a first bushing configuration and in a second bushing configuration adapted to define first and second spacings respectively for receiving the actuator therebetween, and one of the first and second bushing configurations being selected based on the actuator;
   the chassis including first and second laterally spaced longitudinal support structures adapted for supporting the dump body, and
   the cradle assembly further including:
      first and second cradle attachment brackets adapted to be removably connected to the first and second laterally spaced longitudinal support structures respectively; and
      a support frame adapted to be removably connected to the first and second cradle attachment brackets, the support frame being dimensioned for extending laterally between the first and second laterally spaced longitudinal support structures of the chassis, the support frame having spaced apart first and second cradle bushing mounts.

2. The system of claim 1, wherein the set of bushings is adapted for a trunnion type connection between the chassis and the dump body.

3. The system of claim 1, wherein the set of bushings is adapted for a pin-to-pin type connection between the chassis and the dump body.

4. The system of claim 1, wherein the support frame is dimensioned and structured to extend above the first and second laterally spaced support structures of the chassis.

5. The system of claim 1, wherein:
   the support frame defines a plurality of slotted holes;
   the support frame is removably connected to the first and second cradle attachment brackets using a plurality of fasteners; and
   each fastener of the plurality of fasteners extends through a respective slotted hole of the plurality of slotted holes.

6. The system of claim 1, wherein the cradle assembly further includes first and second reinforcing channels adapted to receive therein the first and second laterally spaced longitudinal support structures respectively, the first cradle attachment bracket is adapted to be removably connected simultaneously to the first reinforcing channel and to the first laterally spaced longitudinal support structure; and the second cradle attachment bracket is adapted to be removably connected simultaneously to the second reinforcing channel and to the second laterally spaced longitudinal support structure.

7. The system of claim 1, wherein the support frame is adapted to support at least one of:

a hydraulic system for operating the actuator; and a safety holder adapted for supporting the dump body.

8. The system of claim 1, wherein:

the set of bushings includes first and second cradle bushings adapted to be removably connected to the first and second cradle bushing mounts and to connect to the actuator;

each of the first and second cradle bushings respectively has first and second sides;

the first bushing configuration is a first cradle bushing configuration;

the second bushing configuration is a second cradle bushing configuration;

the first spacing is a first cradle spacing;

the second spacing is a second cradle spacing;

when the first and second cradle bushings are removably connected to the first and second cradle bushing mounts in the first cradle bushing configuration:

the first side of the first cradle bushing faces towards the first side of the second cradle bushing, the second side of the first cradle bushing faces away from the second side of the second cradle bushing, and the cradle assembly has the first cradle spacing defined between the first side of the first cradle bushing and the first side of the second cradle bushing, and when the first and second cradle bushings are removably connected to the first and second cradle bushing mounts in the second cradle bushing configuration:

the first side of the first cradle bushing faces away from the first side of the second cradle bushing, the second side of the first cradle bushing faces towards the second side of the second cradle bushing, and the cradle assembly has the second cradle spacing defined between the second side of the first cradle bushing and the second side of the second cradle bushing.

9. The system of claim 8, wherein the first cradle bushing is identical to the second cradle bushing.

10. The system of claim 8, wherein each cradle bushing is removably connected to one of the first and second cradle bushing mounts using a plurality of clevis pins and a plurality of linchpins.

11. A truck comprising:

a chassis;

a cab connected to the chassis;

a plurality of wheels rotatably connected to the chassis;

a dump body pivotally connected to the chassis; and an actuator connected between the dump body and the chassis by the system of claim 1.

12. A system for connecting an actuator between a dump body and a chassis of a truck, the dump body being pivotally connected to the chassis of the truck, the system comprising:

a cradle assembly for connecting the actuator to the chassis, the cradle assembly being adapted to be removably connected to the chassis;

a hoist bracket assembly for connecting the actuator to the dump body; and the hoist bracket assembly including a set of bushings being configurable in a first bushing configuration and in a second bushing configuration adapted to define first and second spacings respectively for receiving the actuator therebetween, and one of the first and second bushing configurations being selected based on the actuator, the hoist bracket assembly having a base plate adapted to be connected to the dump body, and a bracket adapted to be connected to the base plate, the bracket having first and second hoist bushing mounts;

the set of bushings including first and second hoist bushings adapted to be removably connected to the first and second hoist bushing mounts and to connect to the actuator, each of the first and second hoist bushings respectively having first and second sides;

the first bushing configuration being a first hoist bushing configuration;

the second bushing configuration being a second hoist bushing configuration;

the first spacing being a first hoist spacing;

the second spacing being a second hoist spacing;

when the first and second hoist bushings are removably connected to the first and second hoist bushing mounts in the first hoist bushing configuration:

the first side of the first hoist bushing faces towards the first side of the second hoist bushing, the second side of the first hoist bushing faces away from the second side of the second hoist bushing, and the hoist bracket assembly has the first hoist spacing defined between the first side of the first hoist bushing and the first side of the second hoist bushing, and when the first and second hoist bushings are removably connected to the first and second hoist bushing mounts in the second hoist bushing configuration:

the first side of the first hoist bushing faces away from the first side of the second hoist bushing, the second side of the first hoist bushing faces towards the second side of the second hoist bushing, and the hoist bracket assembly has the second hoist spacing defined between the second side of the first hoist bushing and the second side of the second hoist bushing.

13. The system of claim 12, wherein the first hoist bushing is a mirror image of the second hoist bushing.

14. The system of claim 12, wherein each of the first and second hoist bushings is removably connected to one of the first and second hoist bushing mounts using at least one of a fastener, a pin and a linchpin.

15. The system of claim 12, wherein the set of bushings is adapted for a trunnion type connection between the chassis and the dump body.

16. The system of claim 12, wherein the set of bushings is adapted for a pin-to-pin type connection between the chassis and the dump body.

17. A truck comprising:

a chassis;

a cab connected to the chassis;

a plurality of wheels rotatably connected to the chassis;

a dump body pivotally connected to the chassis; and an actuator connected between the dump body and the chassis by the system of claim 12.

18. A method for connecting an actuator between a dump body and a chassis of a truck, the dump body being pivotally connected to the chassis of the truck, the method comprising the steps of:
connecting a cradle assembly to the chassis,
connecting a hoist bracket assembly to the dump body,
selecting the actuator from:
  a first actuator, and
  a second actuator;
connecting the selected one of the first and second actuators to the cradle assembly and the hoist bracket assembly; and
  when the first actuator is selected, connecting at least one of:
    a set of cradle bushings to the cradle assembly in a first cradle bushing configuration for defining a first cradle spacing adapted for receiving the first actuator, and connecting the first actuator to the cradle assembly comprises connecting the set of cradle bushings to the first actuator; and
    a set of hoist bushings to the hoist bracket assembly in a first hoist bushing configuration for defining a first hoist spacing adapted for receiving the first actuator, and connecting the first actuator to the hoist bracket assembly comprises connecting the set of hoist bushings to the first actuator; and
  when the second actuator is selected, connecting at least one of:
    the set of cradle bushings to the cradle assembly in a second cradle bushing configuration for defining a second cradle spacing adapted for receiving the second actuator, the second cradle spacing being different from the first cradle spacing, and connecting the second actuator to the cradle assembly comprises connecting the set of cradle bushings to the second actuator; and
    the set of hoist bushings to the hoist bracket assembly in a second hoist bushing configuration for defining a second hoist spacing adapted for receiving the second actuator, the second hoist spacing being different from the first hoist spacing, and connecting the second actuator to the hoist bracket assembly comprises connecting the set of hoist bushings to the second actuator.

19. The method of claim 18, wherein the set of cradle bushings includes first and second cradle bushings, each of the first and second cradle bushings having a first side and a second side,
when the first and second cradle bushings are in the first cradle bushing configuration:
  the first side of the first cradle bushing faces towards the first side of the second cradle bushing,
  the second side of the first cradle bushing faces away from the second side of the second cradle bushing, and
  the first cradle spacing is defined between the first side of the first cradle bushing and the first side of the second cradle bushing; and
when the first and second cradle bushings are in the second cradle bushing configuration:
  the first side of the first cradle bushing faces away from the first side of the second cradle bushing,
  the second side of the first cradle bushing faces towards the second side of the second cradle bushing, and
  the second cradle spacing is defined between the second side of the first cradle bushing and the second side of the second cradle bushing.

20. The method of claim 18, wherein the set of hoist bushings includes first and second hoist bushings, each of the first and second hoist bushings having a first side and a second side,
when the first and second hoist bushings are in the first hoist bushing configuration:
  the first side of the first hoist bushing faces towards the first side of the second hoist bushing,
  the second side of the first hoist bushing faces away from the second side of the second hoist bushing, and
  the first hoist spacing is defined between the first side of the first hoist bushing and the first side of the second hoist bushing; and
when the first and second hoist bushings are in the second hoist bushing configuration:
  the first side of the first hoist bushing faces away from the first side of the second hoist bushing,
  the second side of the first hoist bushing faces towards the second side of the second hoist bushing, and
  the second hoist spacing is defined between the second side of the first hoist bushing and the second side of the second hoist bushing.

21. The method of claim 18, wherein the cradle assembly is adapted to be removably connected to the chassis.

* * * * *